(12) United States Patent
Ikegami

(10) Patent No.: US 8,348,436 B2
(45) Date of Patent: Jan. 8, 2013

(54) LIGHT SOURCE DEVICE, IMAGE DISPLAY DEVICE, AND LIGHT AMOUNT CORRECTION METHOD

(75) Inventor: Tomio Ikegami, Chino (JP)

(73) Assignee: Seiko Epson Corporation, Tokyo (JP)

( * ) Notice: Subject to any disclaimer, the term of this patent is extended or adjusted under 35 U.S.C. 154(b) by 1138 days.

(21) Appl. No.: 12/205,455

(22) Filed: Sep. 5, 2008

(65) Prior Publication Data
US 2009/0096779 A1    Apr. 16, 2009

(30) Foreign Application Priority Data
Oct. 15, 2007   (JP) ................. 2007-268004

(51) Int. Cl.
*G01J 1/32*     (2006.01)
*H01S 3/10*     (2006.01)
*G03B 21/14*    (2006.01)

(52) U.S. Cl. .......................... 353/85; 313/307

(58) Field of Classification Search ............ 353/85; 315/307, 308, 311, 291; 345/211, 212, 214; 372/29.014, 29.015
See application file for complete search history.

(56) References Cited

U.S. PATENT DOCUMENTS

| | | | | |
|---|---|---|---|---|
| 7,920,610 | B2* | 4/2011 | Loeber et al. | 372/29.014 |
| 8,053,713 | B2* | 11/2011 | Ikegami | 250/205 |
| 2009/0262104 | A1* | 10/2009 | Ikegami | 345/212 |
| 2010/0002197 | A1* | 1/2010 | Kaneko | 353/31 |

FOREIGN PATENT DOCUMENTS

| | | |
|---|---|---|
| JP | A-07-147446 | 6/1995 |
| JP | A-2002-298354 | 10/2002 |
| JP | A-2003-091853 | 3/2003 |
| JP | A-2003-308624 | 10/2003 |
| JP | A-2004-103168 | 4/2004 |
| JP | A-2004-163527 | 6/2004 |
| JP | A-2005-208231 | 8/2005 |
| JP | A-2006-061597 | 3/2006 |
| JP | A-2007-025191 | 2/2007 |
| JP | A-2007-047354 | 2/2007 |
| JP | A-2007-079087 | 3/2007 |

* cited by examiner

Primary Examiner — William C Dowling
(74) Attorney, Agent, or Firm — Oliff & Berridge, PLC

(57) ABSTRACT

A light source device includes: a light source; a driving signal generating unit that supplies a driving signal to the light source; a light amount measuring unit that measures the amount of light of the light source; and a light amount correcting unit that calculates as a light amount error a difference between a target light amount corresponding to a gray-scale value indicated by gray-scale data input from the outside and the amount of light measured by the light amount measuring unit, corrects a differential efficiency by an integrated value of a product of the light amount error and the gray-scale value, corrects a threshold value of the driving signal, and outputs to the driving signal generating unit a command signal for generating a driving signal having a differential efficiency and a threshold value after the correction.

9 Claims, 16 Drawing Sheets

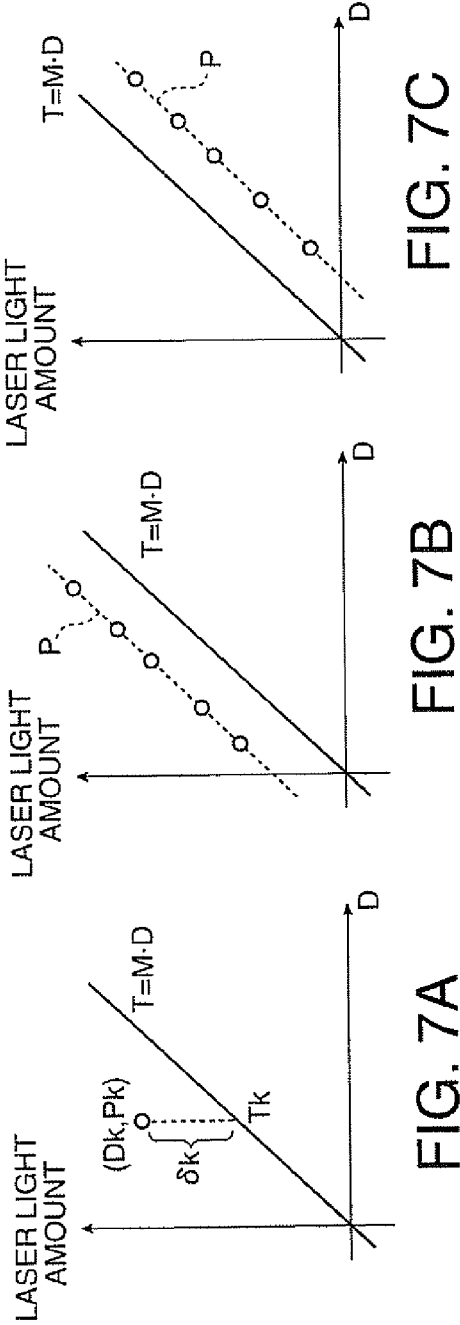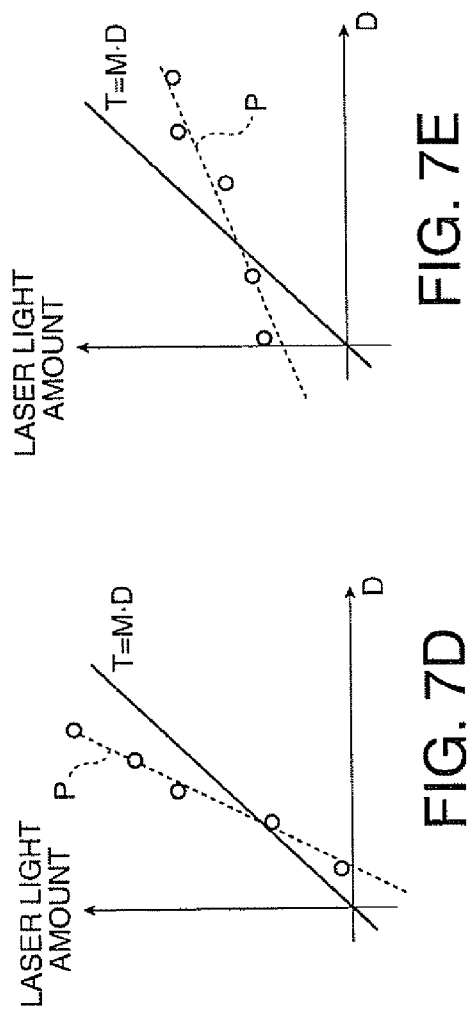

LIGHT SOURCE DEVICE, IMAGE DISPLAY DEVICE, AND LIGHT AMOUNT CORRECTION METHOD

BACKGROUND

1. Technical Field

The present invention relates to a light source device, an image display device, and a light amount correction method.

2. Related Art

In recent years, a laser scanning display that displays an image by raster scanning beam-shaped light, such as a laser beam, onto a projected surface has been drawing attention as one type of an image display device. Such a laser scanning display is characterized in that the contrast is very high because a completely black color can be expressed by stopping supply of a laser beam, the color purity is high because a laser beam has a single wavelength, and a laser beam is easily shaped (easily focused) because the laser beam has high coherence compared with a projector using a liquid crystal light valve, for example. Accordingly, the laser scanning display is expected as a high-quality display that realizes high contrast, high color reproducibility, and high resolution.

As a laser light source of the laser scanning display, a semiconductor laser element, such as a laser diode, is mainly used. However, since a laser characteristic of the semiconductor laser element changes due to a temperature change or aging deterioration, for example, it is necessary to correct the laser light amount in order to obtain desired image brightness.

For example, JP-A-7-147446 discloses a technique in which two or more points of a bias current value of a semiconductor laser element are changed, light emission power of the semiconductor laser element is detected by a light receiving power detecting unit, and a change in quantum efficiency and threshold current value of the semiconductor laser element is detected such that a DC bias current of the semiconductor laser element is set in a bias current control unit, and a level of a laser output is held constant by setting a pulse current, which corresponds to the change in quantum efficiency, in a pulse current control unit. In addition, JP-A-2003-91853 discloses a technique of adjusting an output level of a laser light source by automatically calculating the relational expression between the detected light amount of the laser light source and a set value of a light output and setting data of the relational expression in an optical recording medium drive device.

Thus, in the case of correcting the laser light amount according to a change in laser characteristic resulting from the temperature change or aging deterioration, it is preferable to perform light amount correction in real time according to the change in laser characteristic while actually operating the device in order to further increase the correction accuracy. However, the means therefor is not proposed in the above known techniques.

SUMMARY

Various embodiments provide a light source device capable of increasing the accuracy of light amount correction by performing light amount correction according to a change in light source characteristic in real time, an image display device having the light source device, and a light amount correction method.

According to one embodiment, a light source device includes: a light source; a driving signal generating unit that supplies a driving signal to the light source; a light amount measuring unit that measures the amount of light of the light source; and a light amount correcting unit that calculates as a light amount error a difference between a target light amount corresponding to a gray-scale value indicated by gray-scale data input from the outside and the amount of light measured by the light amount measuring unit, corrects a differential efficiency, which is defined as a variation of the amount of light with respect to a variation in a driving signal of the light source, by an integrated value of a product of the light amount error and the gray-scale value, corrects a threshold value of the driving signal minimum-required to make the light source emit light by an integrated value of the light amount error, and outputs to the driving signal generating unit a command signal for generating a driving signal having a differential efficiency and a threshold value after the correction.

According to the light source device having such a characteristic, while driving the light source, a light amount error which is a difference between a target light amount corresponding to a gray-scale value indicated by gray-scale data input from the outside and the measured light amount is calculated, the differential efficiency which is one of the light source characteristic parameters is corrected by an integrated value of the product of the light amount error and the gray-scale value, a threshold value of a driving signal which is similarly one of the light source characteristic parameters is corrected by an integrated value of the light amount error, and a command signal for generating a driving signal having a differential efficiency and a threshold value after the correction is output to the driving signal generating unit. Accordingly, light amount correction according to a change of a light source characteristic caused by a temperature change during an operation, for example, can be performed in real time and high accuracy of light amount correction can be obtained.

In one embodiment, the driving signal generating unit includes: a gray-scale current generating unit that generates a gray-scale current corresponding to the gray-scale value on the basis of the gray-scale value indicated by the gray-scale data input from the outside and a gray-scale current command signal input from the light amount correcting unit; a threshold current generating unit that generates a threshold current corresponding to a threshold current command signal input from the light amount correcting unit; and a current adding unit that supplies an addition current of the gray-scale current and the threshold current to the light source as the driving signal. In addition, preferably, the light amount correcting unit calculates a current value of a first variable corresponding to the differential efficiency as a differential efficiency after the correction by subtracting a value proportional to an integrated value of a product of the light amount error and the gray-scale value from a previous value of the first variable and outputs the gray-scale current command signal corresponding to the current value of the first variable to the gray-scale current generating unit and calculates a current value of a second variable corresponding to the threshold value as a threshold value after the correction by subtracting a value proportional to an integrated value of the light amount error from a previous value of the second variable and outputs the threshold current command signal corresponding to the current value of the second variable to the threshold current generating unit.

By adopting such a configuration, light amount correction according to a change of a light source characteristic caused by a temperature change during an operation, for example, can be performed in real time and high accuracy of light amount correction can be obtained by sequentially calculating the first and second variables for minimizing the light amount error, which is a difference between the target light amount corresponding to a gray-scale value indicated by gray-scale data input from the outside and the measured light amount, and outputting to the driving signal generating unit a gray-scale current command signal for correcting the differential efficiency and a threshold current command signal for correcting a threshold current, which are acquired on the basis of the first and second variables, while driving the light source.

In one embodiment, the light amount correcting unit uses, as a gray-scale value used in calculating a product of the light amount error and the gray-scale value, a difference between the gray-scale value and an average value of the gray-scale values, a gray-scale value set beforehand, or a middle value in a range of a minimum gray-scale value to a maximum gray-scale value.

Accordingly, even in the case where a difference between the target light amount and the measured light amount occurs, for example, an integrated value of a light amount error and an integrated value of a product of the light amount error and a gray-scale value becomes approximately zero, it can be prevented that the integrated value of the product of the light amount error and the gray-scale value becomes zero. As a result, stopping of the correction operation in the light amount correcting unit can be prevented.

In one embodiment, the light amount correcting unit multiplies a weighting constant so as to be discarded sequentially from a value of a product of a past light amount error and a past gray-scale value when an integrated value of a product of the light amount error and the gray-scale value is calculated and multiplies a weighting constant so as to be discarded sequentially from a value of a past light amount error when an integrated value of the light amount error is calculated.

Since it is preferable to put importance on the latest data (value of a product of a light amount error and a gray-scale value) when calculating an integrated value of the light amount error and an integrated value of a product of a light amount error and a gray-scale value, light amount correction based on the latest data can be performed by multiplying the weighting constant so as to be discarded sequentially from past data as described above. As a result, the accuracy in correcting the amount of light can be improved.

In one embodiment, as an initial setting operation for correcting an offset of a measured light amount that the light amount measuring unit has at the time of supply of power, in the case where the measured light amount when the gray-scale current command signal, the threshold current command signal, and gray-scale data for completely turning off the light source have been output to the driving signal generating unit is acquired as a black-level light amount and then a value obtained by subtracting the black-level light amount from the measured light amount by increasing the threshold current command signal reaches a first set light amount that specifies predetermined brightness, the light amount correcting unit decreases the threshold current command signal, sets as an initial value of the threshold current command signal the threshold current command signal when the value obtained by subtracting the black-level light amount from the measured light amount reaches a second set light amount considered as a black level, outputs gray-scale data indicating a maximum gray-scale value to the driving signal generating unit, increases the gray-scale current command signal, and sets as an initial value of the gray-scale current command signal the gray-scale current command signal when the value obtained by subtracting the black-level light amount from the measured light amount reaches a third set light amount that specifies a maximum target light emission amount.

Accordingly, since initial values of the gray-scale current command signal and threshold current command signal in which the offset of the measured light amount that the light amount measuring unit has is corrected can be acquired, the accuracy in correcting the amount of light can be improved.

Furthermore, in the light source device described above, preferably, the light amount correcting unit uses an initial value of the threshold current command signal, which is acquired by the initial setting operation, as a previous value of the second variable in calculating a current value of the second variable at the beginning and uses an initial value of the gray-scale current command signal as a previous value of the first variable in calculating a current value of the first variable at the beginning.

Thus, the current value of the first variable and the current value of the second variable at the beginning can be calculated with high precision.

According to one embodiment, an image display device that displays an image by scanning light on a projected surface includes; the light source device described above; a scanning unit that scans light generated from the light source of the light source device onto the projected surface; and a video signal processing unit that generates the gray-scale data, which expresses an image to be displayed, on the basis of a video signal supplied from the outside and outputs gray-scale data, which corresponds to the irradiation position of the light on the projected surface, to the driving signal generating unit and the light amount correcting unit of the light source device.

According to the image display device having such a characteristic, since the light amount correction according to a change of a light source characteristic caused by a temperature change during an operation, for example, can be performed in real time and high accuracy of light amount correction can be obtained, display quality can be improved.

In one embodiment, during a period for which light is not scanned onto the projected surface, the video signal processing unit outputs predetermined gray-scale data to the driving signal generating unit and the light amount correcting unit of the light source device and the light amount correcting unit performs the correction on the basis of the amount of light of the light source corresponding to the predetermined gray-scale data, which is measured by the light amount measuring unit, and a gray-scale value indicated by the predetermined gray-scale data.

In the case when a gray-scale value is biased during a display operation, for example, when a very dark image exists, the light amount correction may not be performed normally. As measures against that described above, during a period for which light is not scanned onto the projected surface, that is, a period for which image display is not performed, predetermined gray-scale data is output to the driving signal generating unit and the light amount measuring unit of the light source device to thereby make the light source emit light by means of the video signal processing unit and a light amount correction operation is performed by the light amount correcting unit as described above. As a result, the light amount correction can be performed satisfactorily.

According to one embodiment, a light amount correction method used in a light source device including a light source and a driving signal generating unit that supplies a driving signal to the light source includes: measuring the amount of light of the light source; calculating, as a light amount error, a difference between a target light amount corresponding to a gray-scale value indicated by gray-scale data input from the outside and the amount of light measured in the measuring of the amount of light of the light source; calculating an integrated value of a product of the light amount error and the gray-scale value; correcting a differential efficiency, which is defined as a variation of the amount of light with respect to a variation in a driving signal of the light source, by an integrated value of a product of the light amount error and the gray-scale value; calculating an integrated value of the light amount error; correcting a threshold value of the driving signal, which is minimum required to make the light source emit light, by the integrated value of the light amount error; and outputting to the driving signal generating unit a command signal for generating a driving signal having a differential efficiency and a threshold value after the correction.

According to the light amount correction method having such a characteristic, since the light amount correction according to a change of a light source characteristic caused by a temperature change during an operation, for example, can be performed in real time and high accuracy of light amount correction can be obtained.

BRIEF DESCRIPTION OF THE DRAWINGS

Embodiments are described with reference to the accompanying drawings, wherein like numbers reference like elements.

FIGS. 7A to 7E are views explaining a principle of light amount correction performed in a light amount correction circuit in the image display device according to the embodiment.

DESCRIPTION OF EXEMPLARY EMBODIMENTS

Hereinafter, an embodiment will be described with reference to the accompanying drawings.

Figure 1:
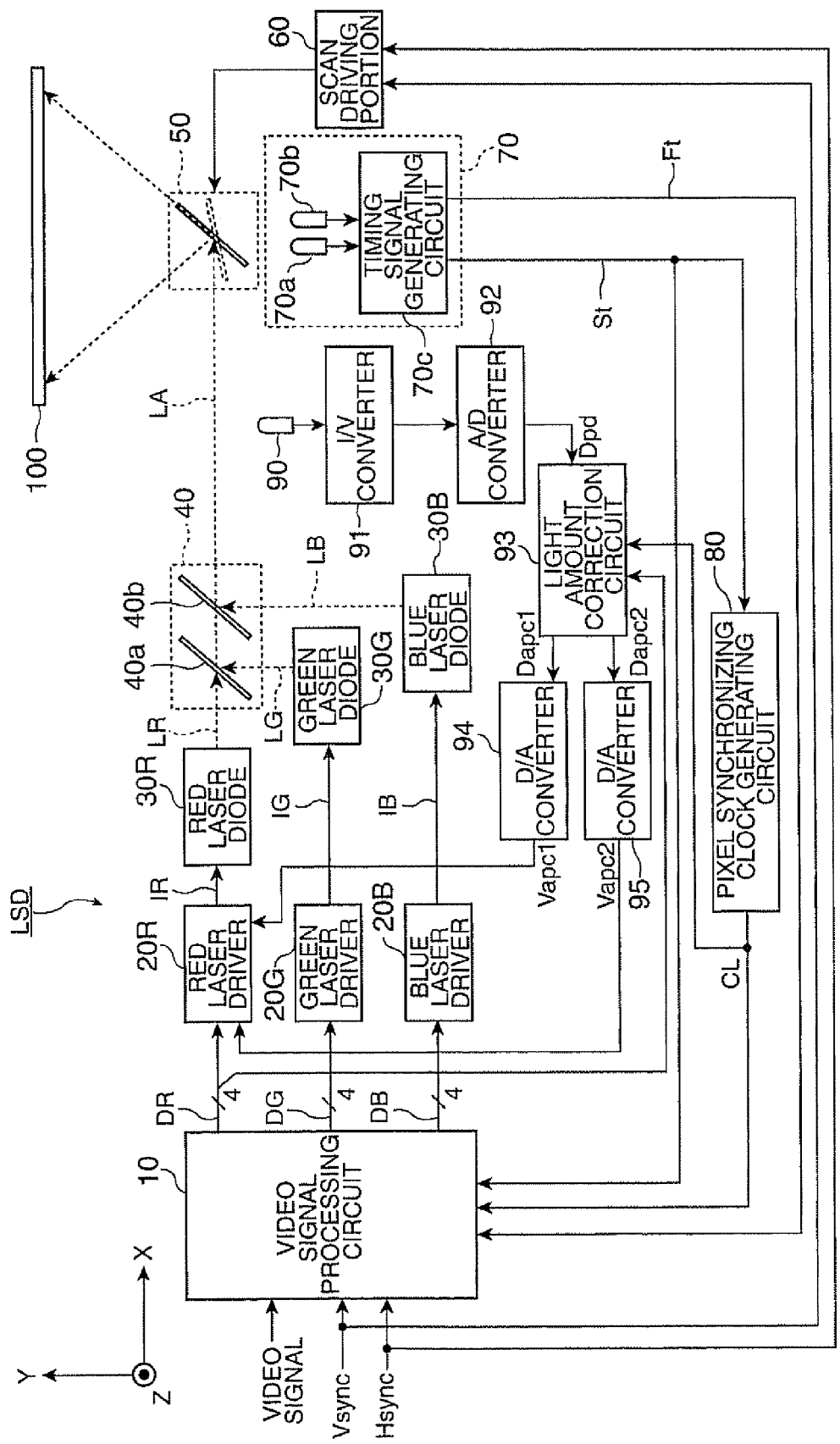
FIG. 1 is a block diagram illustrating the configuration of an image display device according to an embodiment.

FIG. 1 is a block diagram illustrating the configuration of an image display device LSD according to an embodiment. In addition, an explanation will be made using a laser scanning display, which displays an image by scanning a laser beam onto a screen (projected surface) 100, as an example of the image display device LSD.

As shown in FIG. 1, the image display device LSD according to present embodiment includes a video signal processing circuit 10, a red laser driver 20R, a green laser driver 20G, a blue laser driver 20B, a red laser diode 30R, a green laser diode 30G, a blue laser diode 30B, an optical system 40 for optical axis matching, a laser scanning portion 50, a scan driving portion 60, an irradiation position detecting portion 70, a pixel synchronizing clock generating circuit 80, a photoelectric conversion element 90, an I/V converter 91, an A/D converter 92, a light amount correction circuit 93, and D/A converters 94 and 95.

Among the above constituent components, the red laser driver 20R, the green laser driver 20G, the blue laser driver 20B, the a red laser diode 30R, the green laser diode 30G, the blue laser diode 30B, the photoelectric conversion element 90, the I/V converter 91, the A/D converter 92, the light amount correction circuit 93, and the D/A converters 94 and 95 form a light source device according to the embodiment.

In addition, the photoelectric conversion element 90, the I/V converter 91, and the A/D converter 92 form a light amount measuring unit in the embodiment. In addition, a correction circuit block configured to include the photoelectric conversion element 90, the I/V converter 91, the A/D converter 92, the light amount correction circuit 93, and the D/A converters 94 and 95 is provided corresponding to each of the red laser driver 20R, the green laser driver 20G, and the blue laser driver 20B (that is, corresponding to each color). In FIG. 1, however, only a correction circuit block corresponding to the red laser driver 20R is representatively shown for the convenience of explanation.

The video signal processing circuit (video signal processing unit) 10 is input with a video signal and synchronous signals (a vertical synchronous signal Vsync and a horizontal synchronous signal Hsync) transmitted from an external image supply apparatus (not shown), such as a notebook computer, generates digital gray-scale data for specifying a gray-scale value corresponding to each pixel of an image to be displayed on the basis of the video signal and the synchronous signals, and stores the digital gray-scale data in an internal memory in the unit of one frame. In the present embodiment, the bit number N of digital gray-scale data is set to 4 for the convenience of explanation. That is, in this image display device LSD, image display corresponding to 16 gray-scale levels (4096 colors) of '0' to '15' can be realized.

Furthermore, the video signal processing circuit 10 reads the digital gray-scale data stored in the internal memory on the basis of a pulse-shaped frame timing signal Ft for specifying the start of one frame and a pulse-shaped scanning timing signal St for specifying start and end of one horizontal scanning period, which are input from the irradiation position detecting portion 70, and outputs the digital gray-scale data of a pixel corresponding to the irradiation position of a laser beam to the red laser driver 20R, the green laser driver 20G, and the blue laser driver 20B in synchronization with a pulse-shaped pixel synchronizing clock signal CL for specifying the irradiation timing of a laser beam corresponding to each pixel in one horizontal scanning period, which is input from the pixel synchronizing clock generating circuit 80. More specifically, the video signal processing circuit 10 outputs red gray-scale data DR for a red pixel to the red laser driver 20R when a pixel corresponding to the irradiation position of a laser beam is the red pixel, outputs green gray-scale data DG for a green pixel to the green laser driver 20G when a pixel corresponding to the irradiation position of a laser beam is the green pixel, and outputs blue gray-scale data DB for a blue pixel to the blue laser driver 20B when a pixel corresponding to the irradiation position of a laser beam is the blue pixel. Furthermore, the video signal processing circuit 10 outputs the red gray-scale data DR to the light amount correction circuit 93 of a correction circuit block for red color, outputs the green gray-scale data DG to a light amount correction circuit (not shown) of a correction circuit block for green color, and outputs the blue gray-scale data DB to a light amount correction circuit (not shown) of a correction circuit block for blue color.

The red laser driver (driving signal generating unit) 20R is input with the red gray-scale data DR, a threshold current command voltage Vapc1 that are output from the light amount correction circuit 93 through the D/A converter 94, and a gray-scale current command voltage Vapc2 that is output from the light amount correction circuit 93 through the D/A converter 95, generates a laser driving current IR corresponding to the red gray-scale data DR by using the threshold current command voltage Vapc1 and the gray-scale current command voltage Vapc2, and outputs the laser driving current IR to the red laser diode 30R. Hereinafter, the detailed configuration of the red laser driver 20R will be described.

Figure 2:
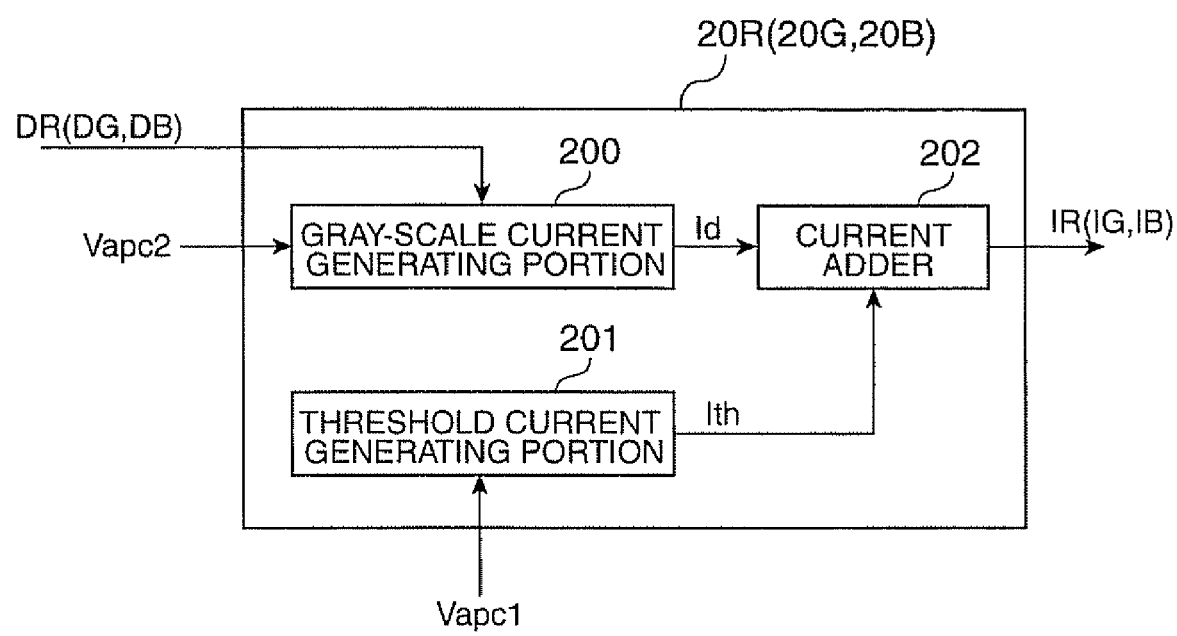
FIG. 2 is a block diagram illustrating the configuration of a red laser driver in the image display device according to the embodiment.

FIG. 2 is a block diagram illustrating the configuration of the red laser driver 20R. As shown in FIG. 2, the red laser driver 20R is configured to include a gray-scale current generating portion 20R a threshold current generating portion 201, and a current adder 202.

The gray-scale current generating portion (gray-scale current generating unit) 200 generates a gray-scale current Id (=H1·Vapc2·D) which is a product of a gray-scale value D indicated by the red gray-scale data DR, the gray-scale current command voltage Vapc2, and a coefficient H1 and outputs the gray-scale current Id to the current adder 202. The threshold current generation portion (threshold current generating unit) 201 generates a threshold current Ith (=H2·Vapc1) which is a product of the threshold current command voltage Vapc1 and a coefficient H2 and outputs the threshold current Ith to the current adder 202. The current adder (current adding unit) 202 adds the gray-scale current Id and the threshold current Ith and outputs the added current to the red laser diode 30R as a laser driving current IR (=Id+Ith).

Figure 3:
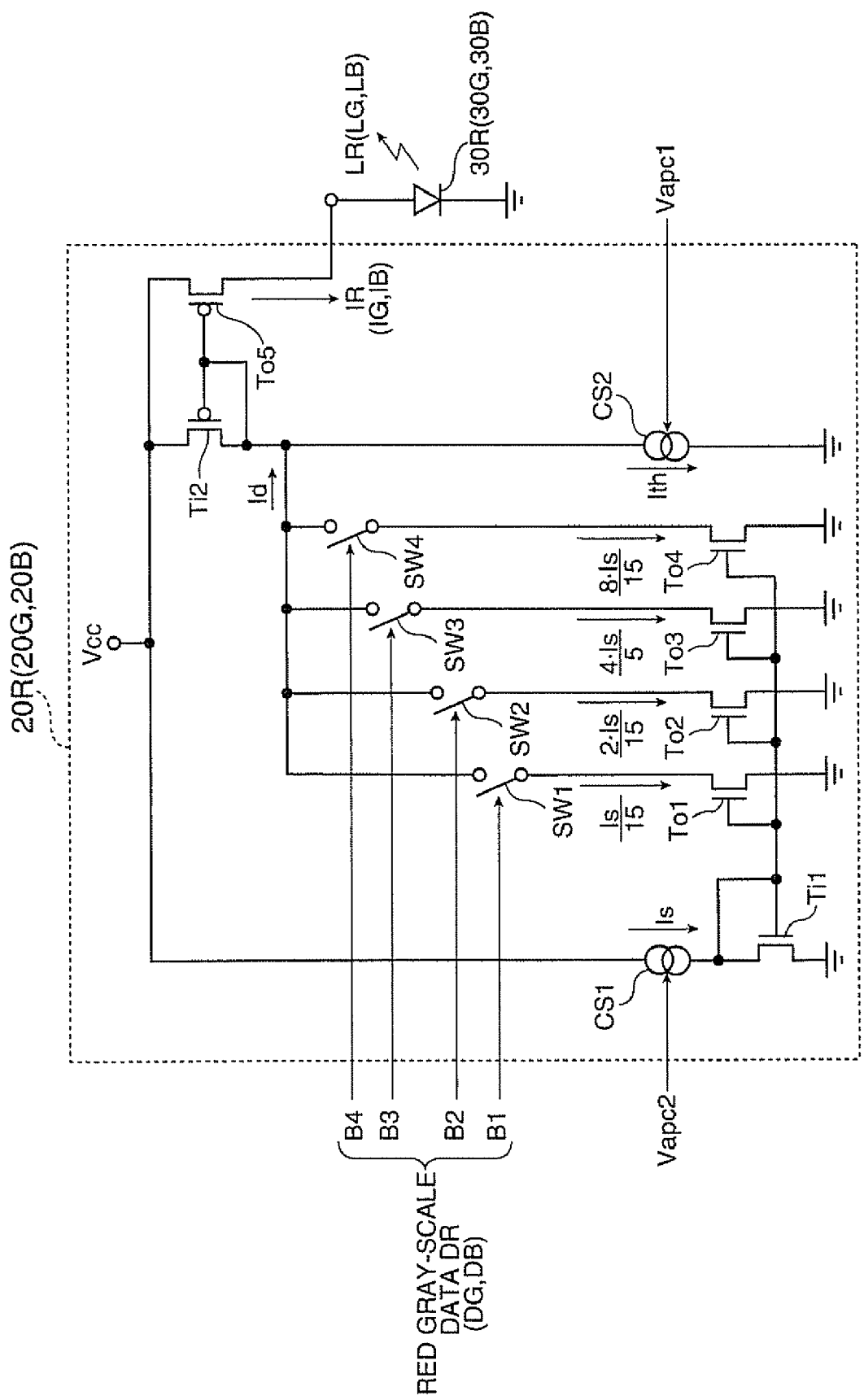
FIG. 3 is a view illustrating the circuit configuration of the red laser driver in the image display device according to the embodiment.

FIG. 3 is a view illustrating the specific circuit configuration of the red laser driver 20R configured as described above. As shown in this FIG. 3, the red laser driver 20R may be configured to include a first current source CS1, a second current source CS2, a first input-side transistor Ti1 a second input-side transistor Ti2, a first output-side transistor To1, a second output-side transistor To2, a third output-side transistor To3, a fourth output-side transistor To4, a fifth output-side transistor To5, a first switching element SW1, a second switching element SW2, a third switching element SW3, and a fourth switching element SW4.

The first current source CS1 is a variable gain type constant current source to which the gray-scale current command voltage Vapc2 is input and which generates a current Is (=H1·Vapc2) that is a product of the gray-scale current command voltage Vapc2 and the coefficient H1. An input terminal of the first current source CS1 is connected to a power supply line Vcc and an output terminal thereof is connected to a drain terminal and a gate terminal of the first input-side transistor Ti1.

The first input-side transistor Ti1 is an n-channel MOS (positive metal oxide semiconductor) transistor. A drain terminal of the first input-side transistor Ti1 is connected to an output terminal of the first current source CS1, a gate terminal thereof is connected to the output terminal of the first current source CS1 and gate terminals of the first output-side transistor To1 to fourth output-side transistor To4, and a source terminal thereof is connected to a ground line.

The first output-side transistor To1 is an n-channel MOS transistor. A drain terminal of the first output-side transistor To1 is connected to one terminal of the first switching element SW1, a gate terminal thereof is connected to the gate terminals of the first input-side transistor Ti1 and second output-side transistor To2 to fourth output-side transistor To4, and a source terminal thereof is connected to the ground line.

The second output-side transistor To2 is an n-channel MOS transistor. A drain terminal of the second output-side transistor To2 is connected to one terminal of the second switching element SW2, a gate terminal thereof is connected to the gate terminals of the first input-side transistor Ti1, first output-side transistor To1, third output-side transistor To3, and fourth output-side transistor To4, and a source terminal thereof is connected to the ground line.

The third output-side transistor To3 is an n-channel MOS transistor. A drain terminal of the third output-side transistor To3 is connected to one terminal of the third switching element SW3, a gate terminal thereof is connected to the gate terminals of the first input-side transistor Ti1, first output-side transistor To1, second output-side transistor To2, and fourth output-side transistor To4, and a source terminal thereof is connected to the ground line.

The fourth output-side transistor To4 is an n-channel MOS transistor. A drain terminal of the fourth output-side transistor To4 is connected to one terminal of the fourth switching element SW4, a gate terminal thereof is connected to the gate terminals of the first input-side transistor Ti1 and first output-side transistor To1 to third output-side transistor To3, and a source terminal thereof is connected to the ground line.

That is, by the first current source CS1, the first input-side transistor Ti1, and the first output-side transistor To1 to fourth output-side transistor To4, a current mirror circuit which has the first input-side transistor Ti1 as an input-side transistor and the first output-side transistor To1 to fourth output-side transistor To4 as output-side transistors is formed. In the present embodiment, electrical properties of the first output-side transistor To1 to fourth output-side transistor To4 are set to generate a current according to bit data corresponding to each of them.

Specifically, the first output-side transistor To1 corresponds to first bit data B1 which is an LSB of 4-bit red gray-scale data DR. Accordingly, the electrical property of the first output-side transistor To1 is set such that a current corresponding to $1/15$ of the current Is generated by the first current source CS1 is generated. In addition, the second output-side transistor To2 corresponds to second bit data B2 of the 4-bit red gray-scale data DR. Accordingly, the electrical property of the second output-side transistor To2 is set such that a current corresponding to $2/15$ of the current Is is generated. In addition, the third output-side transistor To3 corresponds to third bit data B3 of the 4-bit red gray-scale data DR. Accordingly, the electrical property of the third output-side transistor To3 is set such that a current corresponding to $4/15$ of the current Is is generated. In addition, the fourth output-side transistor To4 corresponds to fourth bit data B4 which is an MSB of the 4-bit red gray-scale data DR. Accordingly, the electrical property of the fourth output-side transistor To4 is set such that a current corresponding to $8/15$ of the current Is is generated.

The first switching element SW1 is a switching element that corresponds to the first bit data 31, which is the LSB of the 4-bit red gray-scale data DR, and that switches connection/disconnection between two terminals according to a value of the bit data B1. One terminal of the first switching element SW1 is connected to a drain terminal of the first output-side transistor To1 and the other terminal thereof is connected to an input terminal of the second current source CS2. In the present embodiment, it is assumed that the first switching element SW1 is in a connection state when the bit data 1E is '1' and in a disconnection state when the bit data B1 is '0'.

The second switching element SW2 is a switching element that corresponds to the second bit data B2 of the 4-bit red gray-scale data DR and that switches connection/disconnection between two terminals according to a value of the bit data 32. One terminal of the second switching element SW2 is connected to a drain terminal of the second output-side transistor To2 and the other terminal thereof is connected to the input terminal of the second current source CS2. In the present embodiment, it is assumed that the second switching element SW2 is in a connection state when the bit data B2 is '1' and in a disconnection state when the bit data B2 is '0'.

The third switching element SW3 is a switching element that corresponds to the third bit data B3 of the 4-bit red gray-scale data DR and that switches connection/disconnection between two terminals according to a value of the bit data B3. One terminal of the third switching element SW3 is connected to a drain terminal of the third output-side transistor To3 and the other terminal thereof is connected to the input terminal of the second current source CS2. In the present embodiment, it is assumed that the third switching element SW3 is in a connection state when the bit data 33 is '1' and in a disconnection state when the bit data B3 is '0'.

The fourth switching element SW4 is a switching element that corresponds to the fourth bit data B4, which is an MSB of the 4-bit red gray-scale data DR, and that switches connection/disconnection between two terminals according to a value of the bit data B4. One terminal of the fourth switching element SW4 is connected to a drain terminal of the fourth output-side transistor To4 and the other terminal thereof is connected to the input terminal of the second current source CS2. In the present embodiment, it is assumed that the fourth switching element SW4 is in a connection state when the bit data B4 is '1' and in a disconnection state when the bit data B4 is '0'.

The second current source CS2 is a variable gain type constant current source to which the threshold current command voltage Vapc1 is input and which generates the threshold current Ith (=H2·Vapc1) which is a product of the threshold current command voltage Vapc1 and the coefficient H2. In input terminal of the second current source CS2 is connected to the other terminals of the first switching element SW1 to fourth switching element SW4 and a drain terminal and a gate terminal of the second input-side transistor Ti2 and an output terminal thereof is connected to the ground line.

The second input-side transistor Ti2 is a p-channel MOS transistor. A source terminal of the second input-side transistor Ti2 is connected to the power supply line Vcc, a gate terminal of the second input-side transistor Ti2 is connected to a drain terminal of the second input-side transistor Ti2 and a gate terminal of the fifth output-side transistor To5, and the drain terminal is connected to the input terminal of the second current source CS2 and the other terminals of the first switching element SW1 to fourth switching element SW4

The fifth output-side transistor To5 is a p-channel MOS transistor. A source terminal of the fifth output-side transistor To5 is connected to the power supply line Vcc, a gate terminal thereof is connected to a gate terminal and a drain terminal of the second input-side transistor Ti2, and a drain terminal thereof is connected to an anode terminal of the red laser diode 30R.

That is, the second input-side transistor Ti2 and the fifth output-side transistor To5 form a current mirror circuit that has the second input-side transistor Ti2 at the input side and the fifth output-side transistor To5 at the output side. The current mirror circuit is input with a current, which is obtained by adding the threshold current Ith generated by the second current source CS2 and a current (gray-scale current Id) flowing to the other terminals of the first switching element SW1 to fourth switching element SW4, and outputs a current, which has approximately the same current value as the addition current, to the red laser diode 30R as the laser driving current IR.

Figure 4:
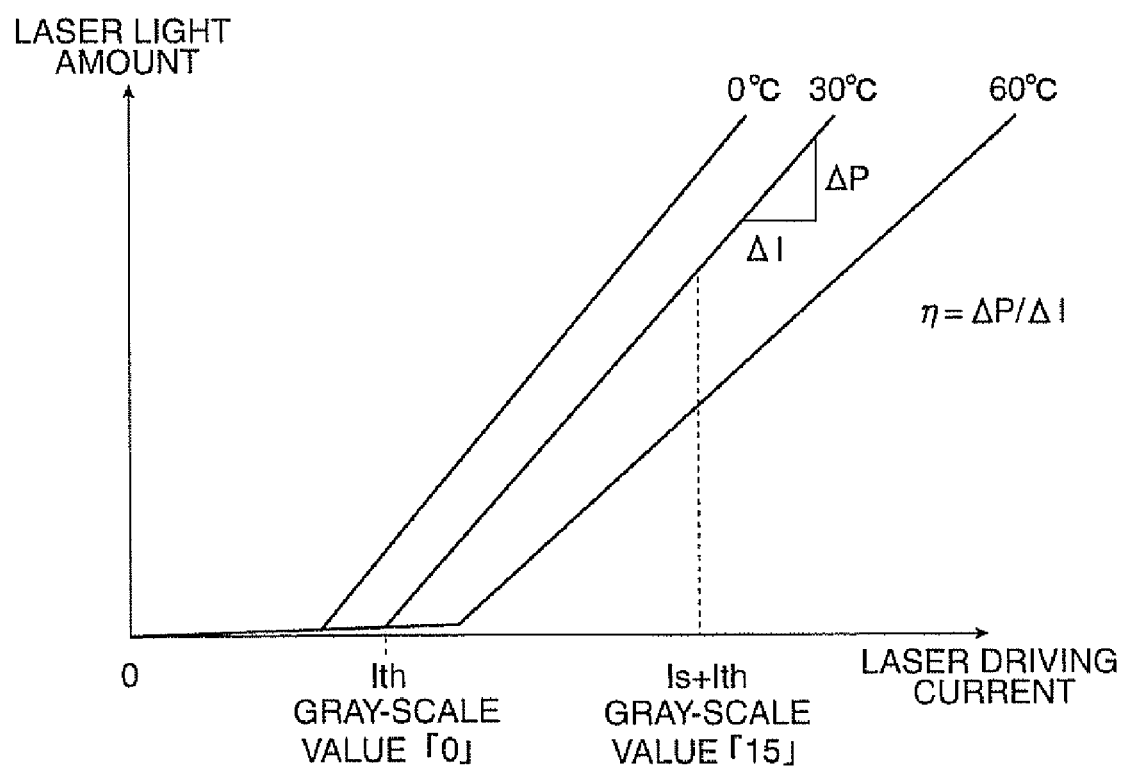
FIG. 4 is a view illustrating a laser characteristic of a red laser diode in the image display device according to the embodiment.

FIG. 4 is a laser characteristic view illustrating the relationship between the laser light amount of the red laser diode 30R and the laser driving current IR. As shown in FIG. 4, the laser driving current IR has a very weak laser light amount in a range smaller than the threshold current Ith. However, if the laser driving current IR becomes larger than the threshold current Ith, the laser light amount increases in proportion to a current value (gray-scale current Id) obtained by subtracting the threshold current Ith from the laser driving current IR.

Specifically, for example, in the case when the red gray-scale data DR is a gray-scale value '0', that is, all of the bit data '1' to B4 is '0', all of the first switching element SW1 to the fourth switching element SW4 are in a non-connection state. Accordingly, since the gray-scale current Id is 0, the laser driving current IR becomes Ith. In this case, as shown in FIG. 4, a laser beam is not generated in the red laser diode 30R (that is, black display). In addition, in the case when the red gray-scale data DR is a gray-scale value '1', that is, the bit data B1 is '1' and the bit data B2 to B4 is '0', only the first switching element SW1 is in a connection state. Accordingly, since the gray-scale current Id becomes Is/15, the laser driving current IR becomes Ith+Is/15. In this case, a laser beam with the amount of light corresponding to the gray-scale current Id=Is/15 obtained by subtracting the threshold current Ith from the laser driving current IR is generated in the red laser diode 30R.

In addition, in the case when the red gray-scale data DR is a gray-scale value '2', that is, the bit data B2 is '1' and the bit data B1, B3, and B4 is '0', only the second switching element SW2 is in a connection state. Accordingly, since the gray-scale current Id becomes 2·Is/15, the laser driving current IR becomes Ith+2·Is/15. In this case, a laser beam with the amount of light corresponding to the gray-scale current Id=2·Is/15 obtained by subtracting the threshold current Ith from the laser driving current IR is generated in the red laser diode 30R.

Thus, the laser driving current TR increases by Is/15 as a gray-scale value increases by '1' and all of the first switching element SW1 to the fourth switching element SW4 are in a connection state in the case of a maximum gray-scale value '15', that is, all of the bit data B1 to B4 is '1'. As a result, since the gray-scale current Id becomes equal to Is, the laser driving current IR becomes Ith+IS. In this case, as shown in FIG. 4, a laser beam with the amount of light (amount of light corresponding to the maximum gray-scale value) corresponding to the gray-scale current Id=Is obtained by subtracting the threshold current Ith from the laser driving current IR is generated in the red laser diode 30R.

That is, since the gray-scale current Id depends on not only the gray-scale current command voltage Vapc2 but also the gray-scale value D indicated by the red gray-scale data DR, the gray-scale current can be expressed as Id=H1·Vapc2·D.

Here, as can be understood from FIG. 4, since the laser characteristic depends on the temperature, the threshold current Ith changes with the temperature. In addition, the inclination (light amount variation $\Delta P$ to current variation $\Delta I$ of the laser characteristic also changes with the temperature. In addition, the inclination of the laser characteristic is hereinafter expressed as differential efficiency $\eta(=\Delta P/\Delta I)$. That is, in order to correct the amount of light according to the change of laser characteristic, it is preferable to correct the threshold current Ith and the differential efficiency $\eta$, which will be described in detail.

The red laser driver 20R has been explained, and an explanation will now be described referring back to FIG. 1. The green laser driver (driving signal generating unit) 20G is input with the green gray-scale data DG and the threshold current command voltage Vapc1 and the gray-scale current command voltage vapc2 output from the correction circuit block for green (not shown), generates a laser driving current IG corresponding to the green gray-scale data DG by using the threshold current command voltage Vapc1 and the gray-scale current command voltage Vapc2, and outputs the laser driving current IG to the green laser diode 30G. The blue laser driver (driving signal generating unit) 20B is input with the blue gray-scale data DB and the threshold current command voltage Vapc1 and the gray-scale current command voltage Vapc2 output from the correction circuit block for blue (not shown), generates a laser driving current IB corresponding to the blue gray-scale data DB by using the threshold current command voltage Vapc1 and the gray-scale current command voltage Vapc2, and outputs the laser driving current IB to the blue laser diode 30B. In addition, since the detailed configurations of the green laser driver 20G and blue laser driver 20B are the same as that of the red laser driver 20R shown in FIGS. 2 and 3, an explanation thereof will be omitted.

The red laser diode (light source) 30R generates a red-colored single laser beam LR corresponding to the laser driving current IR supplied from the red laser driver 20R and irradiates the laser beam LR toward the optical system 40 for optical axis matching (specifically, a first dichroic mirror 40a) provided on an optical axis LA. In the present embodiment, as shown in FIG. 1, a direction approximately parallel to a horizontal plane is set as an X axis, a direction perpendicular to the X axis on the horizontal plane is set as a Y axis, and a direction approximately perpendicular to the horizontal plane (XY plane) is set as a Z axis. Here, the optical axis LA is set to be approximately parallel to the X axis. In addition, an optical axis where the laser beam LR is emitted matches the optical axis LA.

The green laser diode (light source) 30G generates a green-colored single laser beam LG corresponding to the laser driving current IG supplied from the green laser driver 20G and irradiates the laser beam LG toward the optical system 40 for optical axis matching (specifically, the first dichroic mirror 40a) along the Y axis. The blue laser diode (light source) 30B generates a blue-colored single laser beam LB corresponding to the laser driving current IB supplied from the blue laser driver 20B and irradiates the laser beam LB toward the optical system 40 for optical axis matching (specifically, a second dichroic mirror 40b) along the Y axis.

The optical system 40 for optical axis matching is an optical system for performing optical axis matching of the laser beams LR, LG, and LB and is configured to include the first dichroic mirror 40a and the second dichroic mirror 40b. The first dichroic mirror 40a is provided on the optical axis LA with the inclination of 45° with respect to the optical axis LA, makes the laser beam LR transmitted toward the second dichroic mirror 40b along the optical axis LA, and reflects the laser beam LG toward the second dichroic mirror 40b so as to match the optical axis LA. The second dichroic mirror 40b is provided on the optical axis LA with the inclination of 45° with respect to the optical axis LA, makes the laser beam LR and the laser beam LG transmitted toward the laser scanning portion 50 along the optical axis LA, and reflects the laser beam LB toward the laser scanning portion 50 so as to match the optical axis LA.

The laser scanning portion (scanning unit) 50 is a resonance type MEMS (micro electro mechanical system) scanner and scans the laser beams LR, LG, and LB, which are incident through the optical system 40 for optical axis matching, onto the screen 100 on the basis of a scan driving signal input from the scan driving portion 60. Hereinafter, the detailed configuration of the laser scanning portion 50 will be described.

Figure 5:
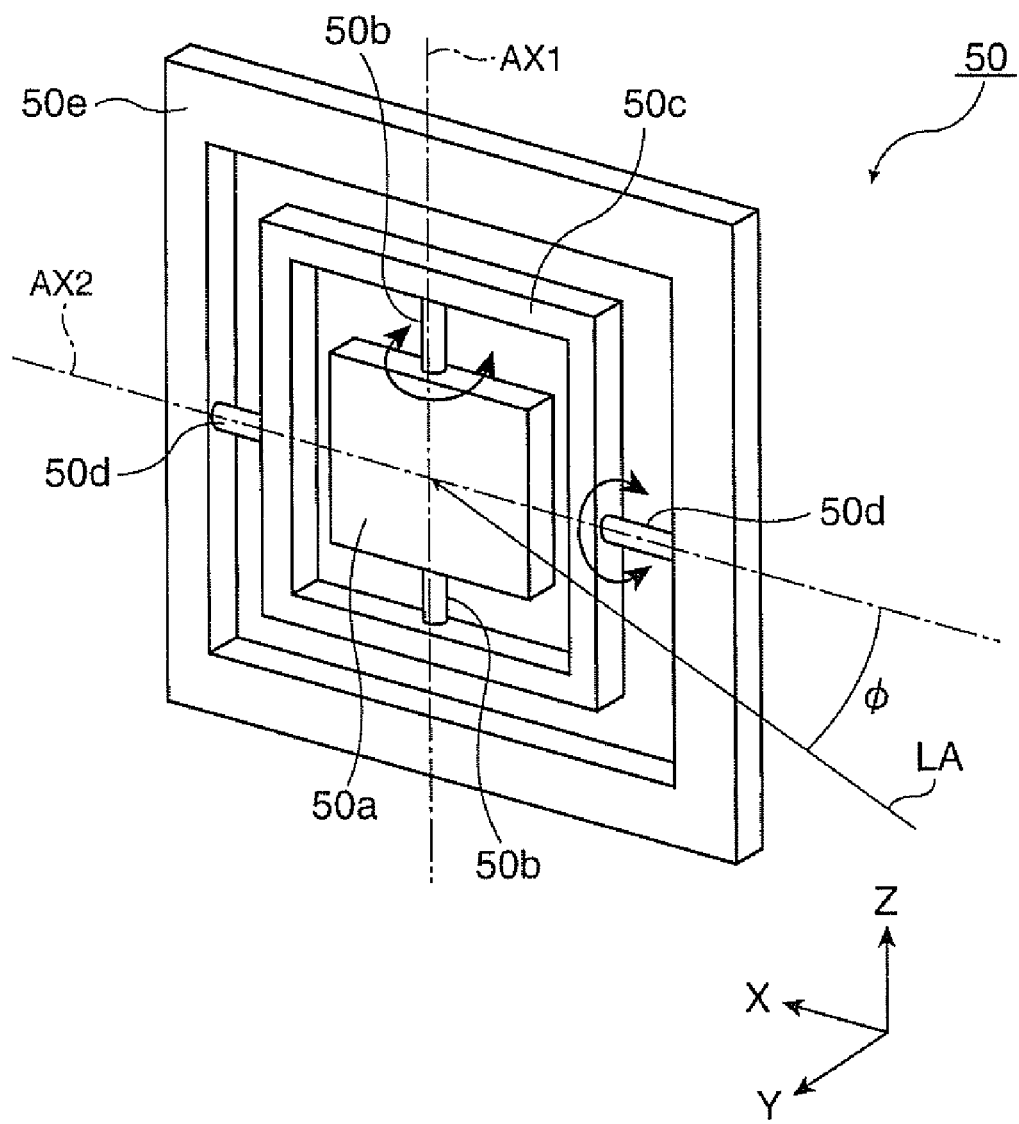
FIG. 5 is a view illustrating the schematic configuration of a laser scanning portion in the image display device according to the embodiment.

FIG. 5 is a view illustrating the schematic configuration of the laser scanning portion 50 which is a MEMS scanner. As shown in this FIG. 5, the laser scanning portion 50 is configured to include a reflecting mirror 50a, a first torsion spring 50b, an inner frame portion 50c, a second torsion spring 50d, and an outer frame portion 50e. In addition, the reflecting mirror 50a, the first torsion spring 50b, the inner frame portion 50c, the second torsion spring 50d, and the outer frame portion 50e are integrally formed by performing microfabrication of a semiconductor material, such as monocrystalline silicon.

The reflecting mirror 50a is a plate-shaped object having a reflecting film, which serves to reflect the laser beams LR, LG, and LB toward the screen 100, formed at a reflecting surface side. The reflecting mirror 50a is connected with the inner frame portion 50c through the first torsion spring (first rotation support portion) 50b provided along a first axis AX1 (approximately perpendicular to a horizontal plane in the case where the XY surface is the horizontal plane) extending along a reflecting surface. That is, the reflecting mirror 50a is supported by the first torsion spring 50b so as to be rotatable around the first axis AX1. The shape of the reflecting mirror 50a may be a square shape as shown in FIG. 5 or a circular or elliptical shape.

The inner frame portion 50c is a plate-shaped object having a frame form. The inner frame portion 50c is connected with the reflecting mirror 50a by the first torsion spring 50b and is connected with the outer frame portion 50e by the second torsion spring (second rotation support portion) 50d provided along a second axis AX2 (approximately parallel to a horizontal plane in the case where the XY surface is the horizontal plane) which extends along the reflecting surface and is approximately perpendicular to the first axis AX1. That is, the inner frame portion 50c (reflecting mirror 50a) is supported by the second torsion spring 50d so as to be rotatable around the second axis AX2. The outer frame portion 50e is a plate-shaped object having a frame form. The outer frame portion 50e is connected with the inner frame portion 50c by the second torsion spring 50d and is connected to a fixed portion (not shown). Furthermore, in the present embodiment, the optical axis LA is set to be parallel to the X axis. Accordingly, if the second axis AX2 is set to be parallel to the X axis, the laser beams LR, LG, and LB are blocked by the outer frame portion 50e and are not incident on the reflecting mirror 50a. In order to prevent this, in the present embodiment, the laser scanning portion 50 is disposed such that the second axis AX2 has the inclination φ with respect to the optical axis LA (X axis) as shown in FIG. 5.

The laser scanning portion 50 having such a configuration scans (that is, horizontally scans) the laser beams LR, LG, and LB in the X-axis direction on the screen 100 by rotating the reflecting mirror 50a around the first axis AX1 and scans (that is, vertically scans) the laser beams LR, LG, and LB in the Z-axis direction on the screen 100 by rotating the reflecting mirror 50a (inner frame portion 50c) around the second axis AX2. In addition, as a driving method for rotating the reflecting mirror 50a, a method of using an electrostatic force generated by applying a voltage signal as a scan driving signal to an electrode disposed at a predetermined position may be adopted as disclosed in JP-A-2007-47354. Alternatively, it is also possible to adopt a method of using the Lorentz force generated by forming a magnetic field by providing a permanent magnet and causing a current signal as a scan driving signal to flow through a coil provided in the reflecting mirror 50a or the inner frame portion 50c. Since such a method of driving the reflecting mirror 50a in the MEMS scanner is a known technique, a detailed explanation thereof will be omitted.

Continuing the explanation referring back to FIG. 1, the scan driving portion 60 is input with synchronous signals (a vertical synchronous signal Vsync and a horizontal synchronous signal Hsync), generates a scan driving signal, which is used to perform rotational driving of the reflecting mirror 50a of the laser scanning portion 50, on the basis of the vertical synchronous signals Vsync and the horizontal synchronous signal Hsync, and outputs the scan driving signal to the laser scanning portion 50.

The irradiation position detecting portion 70 detects the irradiation positions of the laser beams LR, LG, and LB on the screen 100 and is configured to include a horizontal angle sensor 70a, a vertical angle sensor 70b, and a timing signal generating circuit 70c. The horizontal angle sensor 70a detects a rotation angle θ2 of the reflecting mirror 50a around the first axis AX1 and outputs a horizontal angle detection signal, which indicates the rotation angle θ1, to the timing signal generating circuit 70c. The vertical angle sensor 70b detects a rotation angle θ2 of the reflecting mirror 50a around the second axis AX2 and outputs a vertical angle detection signal, which indicates the rotation angle θ2, to the timing signal generating circuit 70c. As the horizontal angle sensor 70a and the vertical angle sensor 70b, an optical type angle sensor that detects the angle by irradiating light onto a back surface (surface opposite a reflecting surface of a laser beam) of the reflecting mirror 50a and receiving light reflected from the back surface is used.

Figure 6:
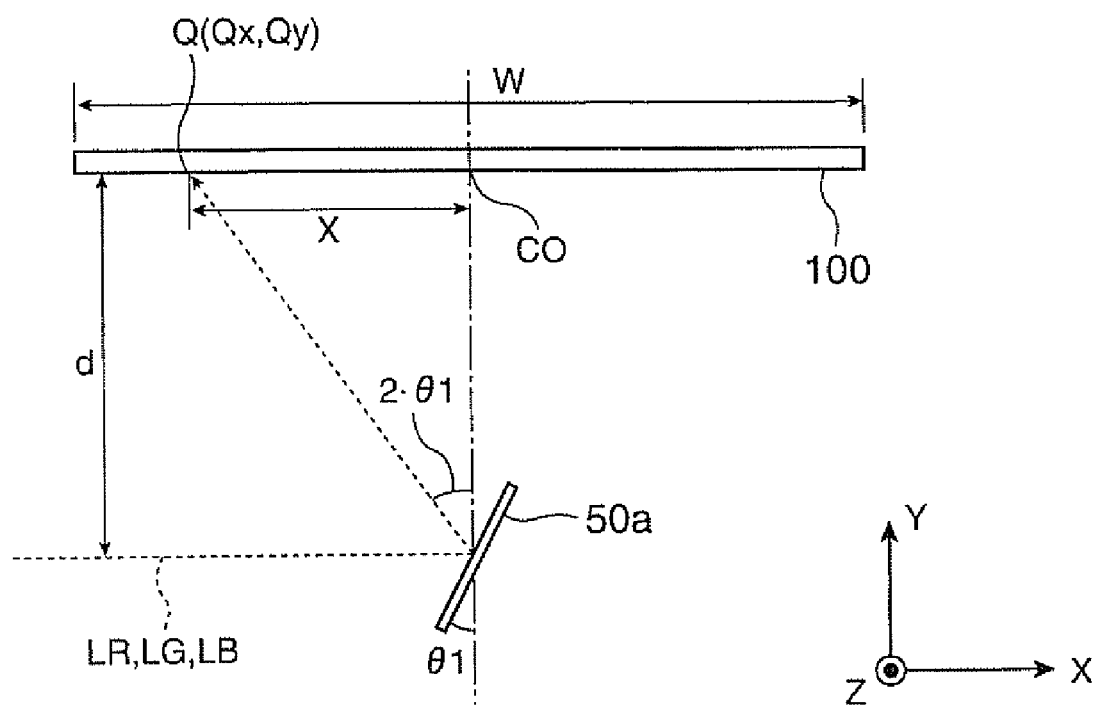
FIG. 6 is a view explaining a rotation angle of a reflecting mirror which is detected by a horizontal angle sensor in the image display device according to the embodiment.

As shown in FIG. 6, the rotation angle θ1 that the horizontal angle sensor 70a detects is an angle of the reflecting mirror 50a with respect to the Y axis on the XY plane. Furthermore, as shown in FIG. 6, when a position apart from a middle point C0 of the screen 100 having a width W by a distance X in the X-axis direction is assumed to be an irradiation position Q of a laser beam, a coordinate Qx of the irradiation position Q in the horizontal scanning direction is expressed as a function of the rotation angle θ1 if a distance d between the reflecting mirror 50a and a screen 100 is known. On the other hand, the rotation angle θ2 that the vertical angle sensor 70b detects is an angle of the reflecting mirror 50a with respect to the Y axis on a YZ plane, and a coordinate Qy of the irradiation position Q in the vertical scanning direction is expressed as a function of the rotation angle θ2. That is, if the rotation angles θ1 and θ2 of the reflecting mirror 50a are detected, the irradiation position Q(Qx, Qy) can be uniquely calculated.

The timing signal generating circuit 70c generates the pulse-shaped scanning timing signal St for specifying the start and end of one horizontal scanning period on the basis of the horizontal angle detection signal indicating the rotation angle θ1 and outputs the scanning timing signal St to the video signal processing circuit 10 and the pixel synchronizing clock generating circuit 80. In addition, the timing signal generating circuit 70c generates the pulse-shaped frame timing signal Ft for specifying the start of one frame on the basis of the vertical angle detection signal indicating the rotation angle θ2 and outputs the frame timing signal Ft to the video signal processing circuit 10.

Specifically, in the timing signal generating circuit 70, the rotation angle θ1 corresponding to the irradiation position Q equivalent to the start position and end position of one horizontal scanning period and the rotation angle θ2 corresponding to the irradiation position Q equivalent to the start position of one frame are set beforehand on the basis of the unique relationship among the rotation angles θ1 and θ2 of the reflecting mirror 50a and the irradiation position Q. In addition, the timing signal generating circuit 70 outputs the scanning timing signal St when the rotation angle θ1 indicated by the horizontal angle detection signal matches the rotation angle θ1 set beforehand and outputs the frame timing signal Pt when the rotation angle θ2 indicated by the vertical angle detection signal matches the rotation angle θ2 set beforehand.

The pixel synchronizing clock generating circuit 80 is input with the scanning timing signal St, generates the pulse-shaped pixel synchronizing clock signal CL, which specifies the irradiation timing of the laser beams LR, LG, and LB corresponding to each pixel in one horizontal scanning period, on the basis of the scanning timing signal St, and outputs the pixel synchronizing clock signal CL to the video signal processing circuit 10 and the light amount correction circuit 93. In addition, this pixel synchronizing clock signal CL is output to a light amount correction circuit of a correction circuit block corresponding to each color.

The photoelectric conversion element 90 is a photodiode, for example. A light receiving surface of the photoelectric conversion element 90 is disposed toward the optical axis LA, and the photoelectric conversion element 90 outputs a current signal corresponding to the light amount of the laser beam LR to the I/V converter 91. The I/V converter 91 converts a current signal input from the photoelectric conversion element 90 into a voltage signal and outputs the converted signal to the A/D converter 92. The A/D converter 92 converts the voltage signal input from the I/V converter 91 into digital data (light amount measurement data) Dpd and outputs the converted digital data to the light amount correction circuit 93.

Here, a principle of light amount correction in the present embodiment, which is the requisite in explaining the detailed configuration of the light amount correction circuit (light amount correcting unit) 93, will be described.

Now, it is assumed that a target light amount T is expressed as T=M·D and an actual laser light amount P is expressed as P=a·D+b. Here, 'D' is a gray-scale value indicated by gray-scale data corresponding to each color, 'M' is a coefficient, and 'a' and 'b' are variables ('a' is a first variable and 'b' is a second variable).

As shown in FIG. 7A, assuming that the target light amount corresponding to a predetermined gray-scale value $D_k$ is $T_k$ and a laser light amount is $Pk$, a difference between $P_k$ and $T_k$ is expressed as a light amount error $\delta_k$. It is a basic idea of light amount correction in the present embodiment to set the threshold current command value Dapc1 and the gray-scale current command value Dapc2 such that the light amount error $\delta_k$ is minimized.

FIG. 7B shows a case in which a laser characteristic changes to make the variable b of the laser light amount P large, FIG. 7C shows a case in which a laser characteristic changes to make the variable b of the laser light amount P small, FIG. 7D shows a case in which a laser characteristic changes to make the variable a of the laser light amount P large, and FIG. 7E shows a case in which a laser characteristic changes to make the variable a of the laser light amount P small. Since the variable b is a variable corresponding to the threshold current Ith and the variable a is a variable corresponding to the differential efficiency η, it is understood that the threshold current Ith is preferably corrected in the cases shown in FIGS. 7B and 7C and the differential efficiency η is preferably corrected in the cases shown in FIGS. 7D and 7E. That is, the threshold current Ith is corrected by the threshold current command value Dapc1 and the differential efficiency η is corrected by the gray-scale current command value Dapc2.

As described above, in order to set the threshold current command value Dapc1 and the gray-scale current command value Dapc2, it is necessary to measure the light amount error $\delta(=P-T)$ between the target light amount T corresponding to the predetermined gray-scale value D and the laser light amount P which is an actual measurement value. In this case, since a set value becomes inaccurate due to a measurement error if the number of times of measurement is small, it is desirable to increase the number of times of measurement and to improve the accuracy of measurement in a sequential manner. In the present embodiment, a least square method which uses a method of steepest descent capable of sequentially searching a minimum value of a square sum of the light amount error δ in highest speed is utilized.

Here, when the gray-scale value D is set and a procedure for measuring the laser light amount P is repeated to k, it is assumed that laser amounts with respect to gray-scale values $\{D_1, D_2, \ldots, D_i, \ldots, D_k\}$ are $\{P_1, P_2, \ldots, P_i, \ldots, P_k\}$ and target light amounts with respect to gray-scale values $\{D_1, D_2, \ldots, D_i, \ldots, D_k\}$ are $\{T_1, T_2, \ldots, T_i, \ldots, T_k\}$. By expressing an evaluation function $\epsilon_k$ as a square sum of light amount errors like the following expression (1), the variables a and b which minimize the evaluation function $\epsilon_k$ are sequentially calculated for i. By calculating the inclination according to the change of the variables a and b and using the method of steepest descent for correcting a and b in the direction, $a_k$ and $b_k$ can be expressed by the following expressions (2) and (3). In addition, in the following expressions (2) and (3), μa and μb are coefficients.

$$\varepsilon_k = \sum_{i=1}^{k} (P_i - T_i)^2 \tag{1}$$

$$a_k = a_{k-1} - \frac{\mu_a}{2} * \frac{\partial \varepsilon_k}{\partial a} \tag{2}$$

$$b_k = b_{k-1} - \frac{\mu_b}{2} * \frac{\partial \varepsilon_k}{\partial b} \tag{3}$$

In the following expression (2), $\partial \epsilon_k/\partial a$ is expressed by the following expression (4). In the following expression (3), $\partial \epsilon_k/\partial b$ is expressed by the following expression (5). Accordingly, the following expression (6) is obtained from the expressions (2) and (4), the following expression (7) is obtained from the expressions (3) and (5). Moreover, when a change is made for sequential calculation, the following expressions (8) to (12) are obtained.

$$\frac{\partial \varepsilon_k}{\partial a} = \frac{\partial}{\partial a} \left\{ \sum_{i=1}^{k} (P_i - T_i)^2 \right\} \tag{4}$$

$$= \frac{\partial}{\partial a} \left\{ \sum_{i=1}^{k} (a * D_i + b - T_i)^2 \right\}$$

$$= 2 * \sum_{i=1}^{k} (a * D_i + b - T_i) * D_i$$

$$= 2 * \sum_{i=1}^{k} (P_i - T_i) * D_i = 2 * \sum_{i=1}^{k} \delta_i * D_i$$

$$\frac{\partial \varepsilon_k}{\partial b} = \frac{\partial}{\partial b} \left\{ \sum_{i=1}^{k} (P_i - T_i)^2 \right\} \tag{5}$$

$$= \frac{\partial}{\partial b} \left\{ \sum_{i=1}^{k} (a * D_i + b - T_i)^2 \right\}$$

$$= 2 * \sum_{i=1}^{k} (a * D_i + b - T_i)$$

$$= 2 * \sum_{i=1}^{k} (P_i - T_i) = 2 * \sum_{i=1}^{k} \delta_i$$

Here, $\delta_i = P_i - T_i$ $$a_k = a_{k-1} - \mu_a * \sum_{i=1}^{k} \delta_i * D_i \tag{6}$$

$$b_k = b_{k-1} - \mu_b * \sum_{i=1}^{k} \delta_i \tag{7}$$

$$\delta_k = p_k - M * D_k \tag{8}$$

$$a_k = a_{k-1} - \mu_a * Sa_k \tag{9}$$

$$Sa_k = Sa_{k-1} + \delta_k * D_k \tag{10}$$

$$b_k = b_{k-1} - \mu_b * Sb_k \tag{11}$$

$$Sb_k = Sb_{k-1} + \delta_k \tag{12}$$

Since the variable b is a variable corresponding to the threshold current Ith and the variable a is a variable corresponding to the differential efficiency η, it is understood that the differential efficiency η is preferably corrected by an integrated value of a product between a light amount error and a gray-scale value as expressed in the above expression (10) and the threshold current Ith is preferably corrected by an integrated value of a light amount error as expressed in the above expression (12).

Now, a method of applying the principle described above to a circuit will be described.

Figure 8:
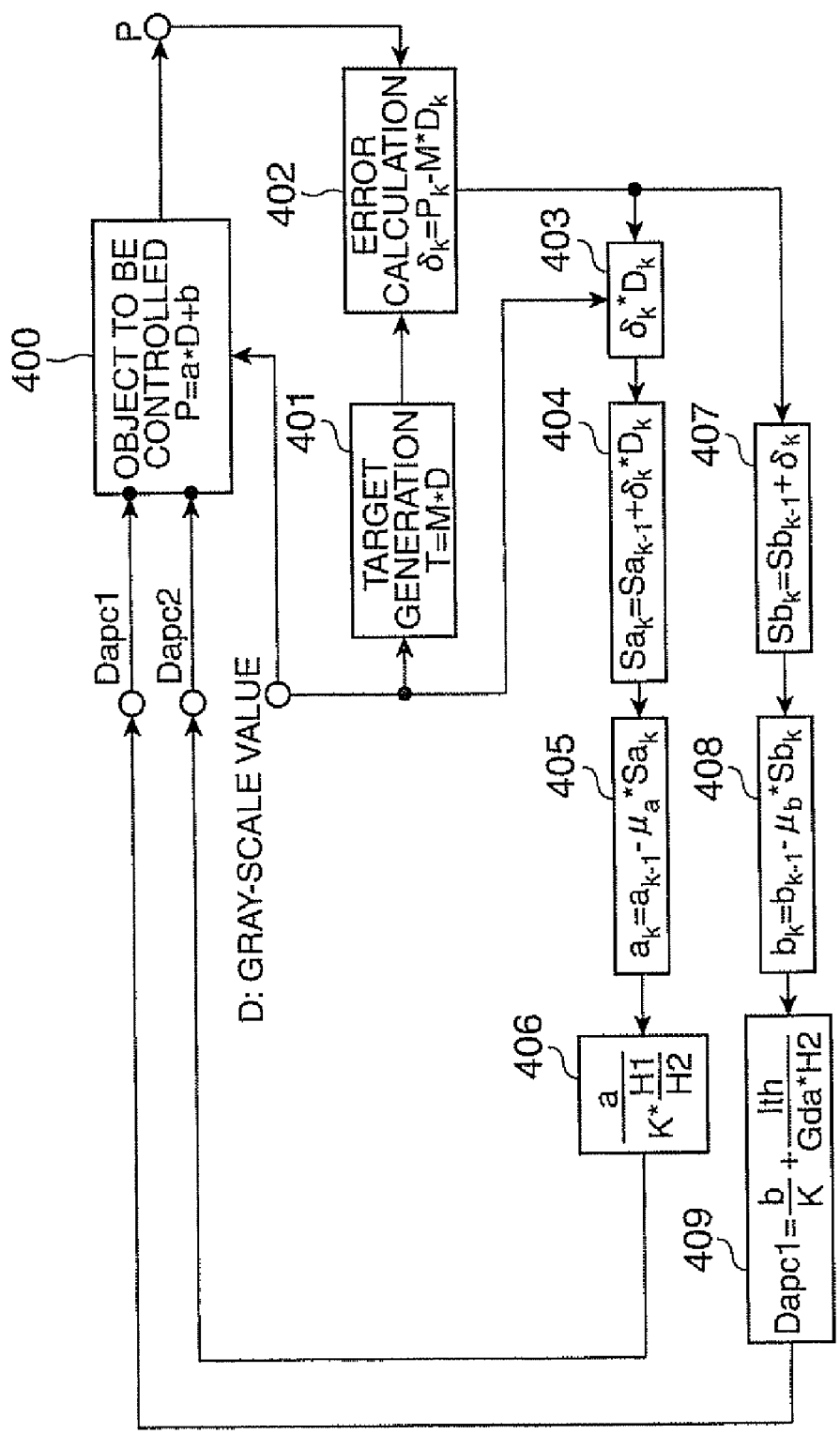
FIG. 8 is a first explanatory view illustrating the light amount correction circuit in the image display device according to the embodiment.

First, the above method is shown in FIG. 8. Laser drivers, laser diodes, the photoelectric conversion element 90, and the like from the D/A converters 94 and 95 to the A/D converter 92 are set as an object to be controlled 400, and the threshold current command value Dapc1 and the gray-scale current command value Dapc2 are calculated from the laser light amount P and the gray-scale value D.

Here, the object to be controlled 400 will be described. A laser driving current I, a laser light amount W, an output current Ipd of the photoelectric conversion element 90, an output voltage VL of the I/V converter 91, an output value P of the A/D converter 92, the threshold current command voltage Vapc1, and the gray-scale current command voltage Vapc2 are expressed by the following expressions (13) to (19). In addition, in the following expressions (13) to (19), H1, H2, F, Kpd, R, Gad, and Gda are coefficients.

$$I = H1 * Vapc2 * D + H2 * Vapc1 \tag{13}$$

$$W = F * (I - Ith) \tag{14}$$

$$Ipd = Kpd * W \tag{15}$$

$$VL = R * Ipd \tag{16}$$

$$P = Gad * VL \tag{17}$$

$$Vapc1 = Gda * Dapc1 \tag{18}$$

$$Vapc2 = Gda * Dapc2 \tag{19}$$

Substituting other expressions into the expression (17) one by one, the following expression (20) is obtained. On the other hand, since P=a·D+b is defined as described above, the variable a is expressed by the following expression (21) and the variable b is expressed by the following expression (22) from the expression (20). That is, by changing the expression (21), the following expression (23) that is conversion equation for converting $a_k$ after correction into the gray-scale current command value Dapc2 in a conversion element is obtained. In addition, by changing the expression (22), the following expression (24) that is conversion equation for converting $b_k$ after correction into the threshold current command value Dapc1 in a conversion element 409 is obtained.

$$\begin{aligned} P &= Gad * VL = Gad * R * Ipd \\ &= Gad * R * Kpd * W = Gad * R * Kpd * F * \{I - Ith\} \\ &= Gad * R * Kpd * F * \{H1 * Vapc2 * D + H2 * Vapc1 - Ith\} \\ &= Gad * R * Kpd * F * \{H1 * Gda * Dapc2 * D + \\ &\quad H2 * Gda * Dapc1 - Ith\} \\ &= Gad * R * Kpd * F * Gda * H2 * \left\{ \frac{H1}{H2} * Dapc2 * D + \right. \\ &\quad \left. Dapc1 - \frac{Ith}{Gda * H2} \right\} \\ &= K * \left\{ \frac{H1}{H2} * Dapc2 * D + Dapc1 - \frac{Ith}{Gda * H2} \right\} \end{aligned} \tag{20}$$

In addition K=Gad*R*Kpd*F*Gda*H2

$$a = K * \frac{H1}{H2} * Dapc2 \tag{21}$$

$$b = K * \left\{ Dapc1 - \frac{Ith}{Gda * H2} \right\} \tag{22}$$

$$Dapc2 = \frac{a \cdot H2}{K \cdot H1} \tag{23}$$

$$Dapc1 = \frac{b}{K} + \frac{Ith}{Gda \cdot H2} \tag{24}$$

Figure 9A:
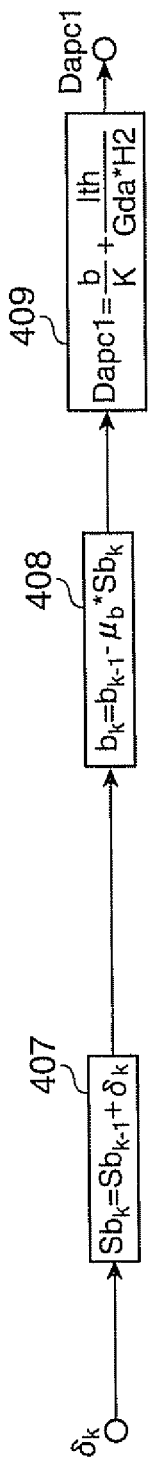
FIGS. 9A to 9D are second explanatory views illustrating the light amount correction circuit in the image display device according to the embodiment.
Figure 9B:
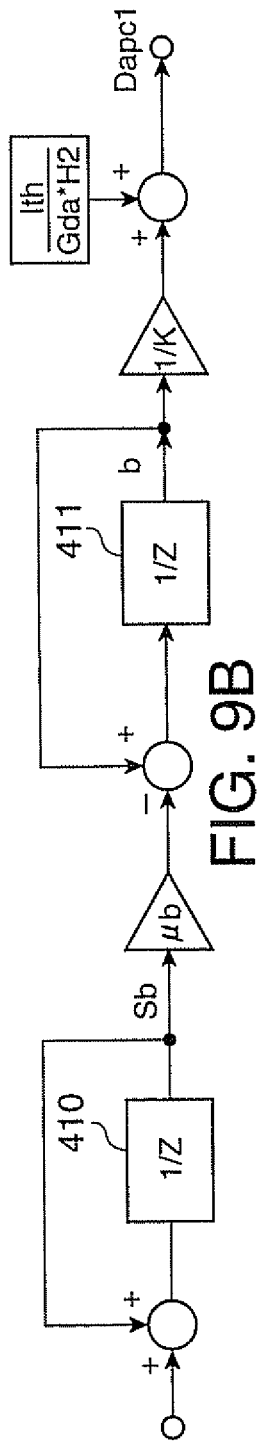
Figure 9C:
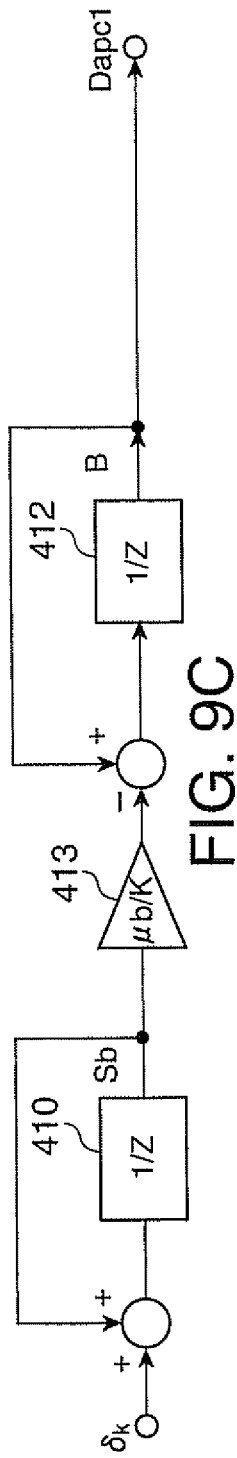

Noting portions for calculating the threshold current command value Dapc1, an error addition element 407, a correction element 408, and a variable conversion element 409 are connected in series as shown in FIG. 9A. When this is expressed as a block diagram using delay elements 410 and 411, FIG. 9B is obtained. The delay element 410 integrates errors and the delay element 411 performs sequential correction of the parameter b. In order to simplify this block diagram, the expression (11) is changed to obtain the expression (25). Then, the expression (27) is obtained by performing variable conversion of 'b' of the expression (25) using the expression (26). When the expression (27) is expressed as a block diagram, a result shown in FIG. 9C is obtained. That is, by multiplying an output of the delay element 410 by μb/K with a gain element 413 and transmitting the resulting output to a delay element 412, an operation equivalent to that of FIG. 9B is performed.

$$\frac{b_k}{K} + \frac{Ith}{Gda * H2} = \frac{b_{k-1}}{K} + \frac{Ith}{Gda * H2} - \frac{\mu_b}{K} * Sb_k \tag{25}$$

$$B_k = \frac{b_k}{K} + \frac{Ith}{Gda * H2} \tag{26}$$

$$B_k = B_{k-1} - \frac{\mu_b}{K} * Sb_k \tag{27}$$

Figure 9D:
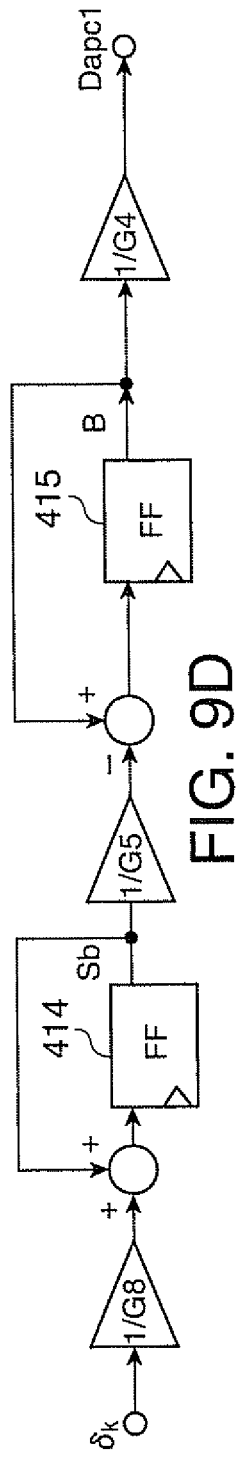

Here, in order to realize the delay element with a flip-flop, it is necessary to prevent digit omission in an operation. Therefore, by inserting a calculating element for gain control in each place and then replacing a delay element with a flip-flop, a result shown in FIG. 9D is obtained. In order for those shown in FIGS. 9C and 9D to perform the same operation, it is preferable that each gain satisfies the relationship of expression (28). In addition, although an output of a flip-flop 414 is a variable obtained by scaling $Sa_k$ and an output of a flip-flop 415 is a variable obtained by performing variable conversion of $b_k$, the outputs may be hereinafter be expressed as $Sb_k$ and $b_k$ for the simplicity of explanation.

$$\frac{\mu_b}{K} = \frac{1}{G4} \cdot \frac{1}{G5} \cdot \frac{1}{G6} \tag{28}$$

Figure 10A:
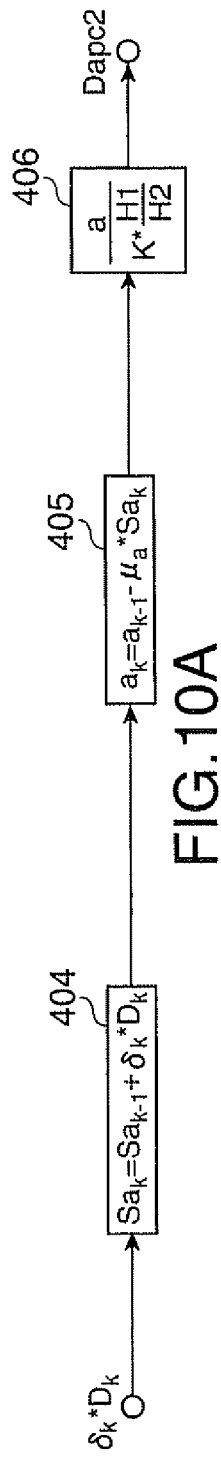
FIGS. 10A to 10D are third explanatory views illustrating the light amount correction circuit in the image display device according to the embodiment.
Figure 10B:
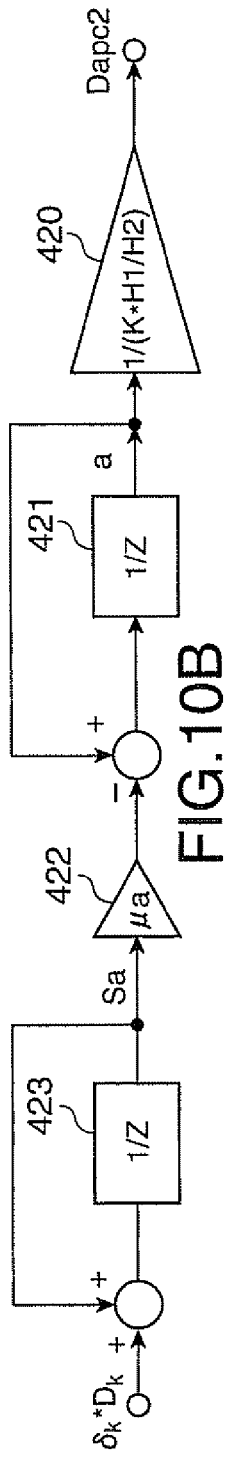
Figure 10C:
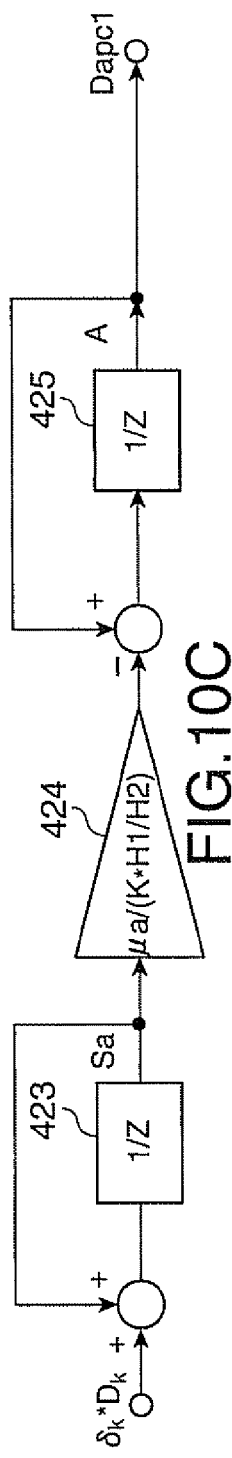

Then, a portion for calculating the gray-scale current command value Dapc2 shown in FIG. 8 is noted. When this portion is separated, an error addition element 404, a correction element 405, and a variable conversion element 406 are connected in series as shown in FIG. 10A. If this is expressed in a block diagram using a delay element, a result shown in FIG. 10B is obtained. Referring to this drawing, it is understood that an operation between input and output does not change even if a gain element 420 moves to obtain a result shown in FIG. 10C. This corresponds to changing the expression (9) to the expression (29) and changing the expression (30) to the expression (31) by replacing a variable.

$$\frac{a_k}{(K * H1/H2)} = \frac{a_{k-1}}{(K * H1/H2)} - \frac{\mu_a}{(K * H1/H2)} * Sa_k \tag{29}$$

$$A_k = \frac{a_k}{(K * H1/H2)} \tag{30}$$

$$A_k = A_{k-1} - \frac{\mu_a}{(K * H1/H2)} * Sa_k \tag{31}$$

Figure 10D:
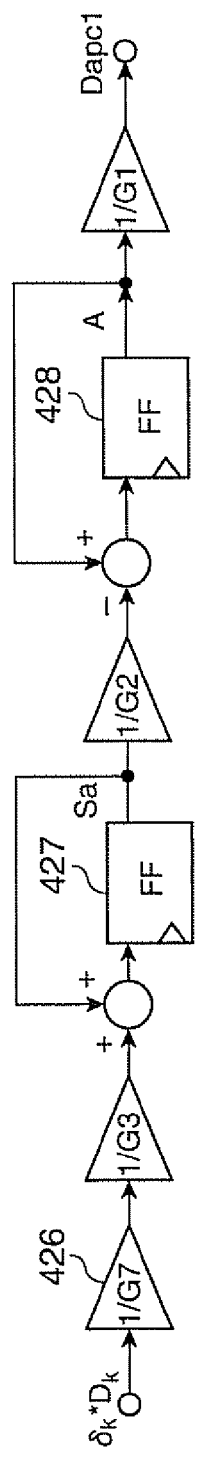

Therefore, by inserting a gain element in each place and then replacing a delay element with a flip-flop in the same manner as described earlier, a result shown in FIG. 10D is obtained. Here, a gain element 426 is inserted for gain control so as to make a circuit common. If each gain satisfies the expression (32), the same operation is performed in FIGS. 10C and 10D. In addition, although an output of a flip-flop 427 is a variable obtained by scaling $Sa_k$ and an output of a flip-flop 428 is a variable obtained by scaling $a_k$, the outputs may hereinafter be expressed as $Sa_k$ and $b_k$ for the simplicity of explanation.

$$\frac{\mu_a}{K \cdot \frac{H1}{H2}} = \frac{1}{G7} \cdot \frac{1}{G1} \cdot \frac{1}{G2} \cdot \frac{1}{G3} \quad (32)$$

Figure 11:
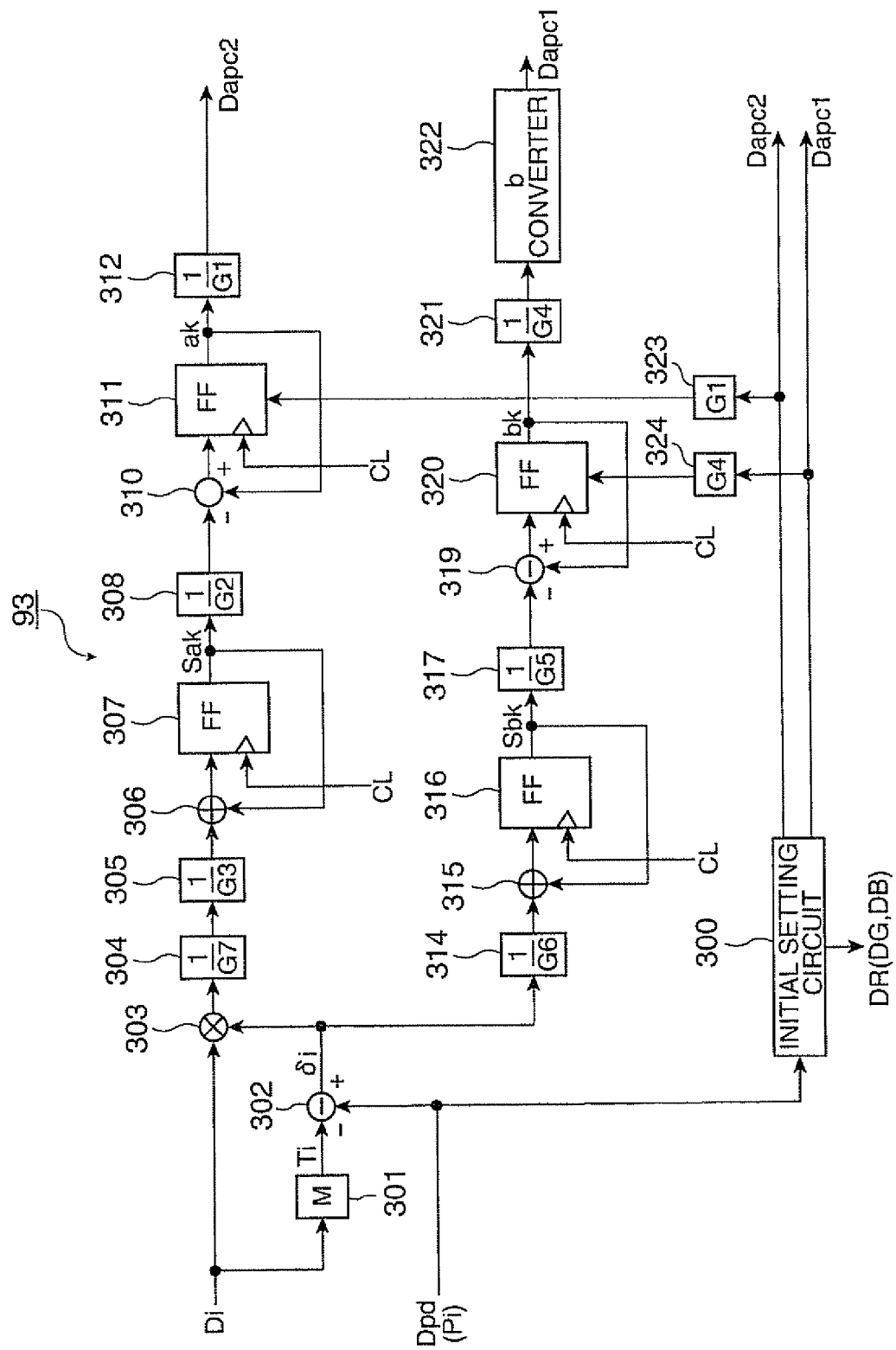
FIG. 11 is a view illustrating the detailed configuration of the light amount correction circuit in the image display device according to the embodiment.

Hereinafter, on the basis of the principle of light amount correction of in the present embodiment, the detailed configuration of the light amount correction circuit 93 will be described with reference to FIG. 11. As shown in FIG. 11, the light amount correction circuit 93 is configured to include an initial setting circuit 300, an M multiplier 301, a subcontracter 302, a multiplier 303, a G7 divider 304, a G3 divider 305, an adder 306, a flip-flop 307, a G2 divider 305, an subcontracter 310, a flip-flop 311, a G1 divider 312, a G6 divider 314, an adder 315, a flip-flop 316, a G5 divider 317, a subcontracter 319, a flip-flop 320, a G5 subcontracter 321, a G1 multiplier 323, and a G4 multiplier 324.

The initial setting circuit 300 performs a predetermined initial setting operation by adjusting the threshold current command value Dapc1 and the gray-scale current command value Dapc2 on the basis of a light amount measurement value $P_i$, which is indicated by the light amount measurement data Dpd, when power is supplied to the image display device LSD or the image display device LSD is reset. In addition, the initial setting circuit 300 has a function of outputting the gray-scale data DR, DG, and DB corresponding to respective colors, which are used during the initial setting operation, to the laser driver 20R, 20G, and 20B corresponding to the respective colors. In addition, details of the initial setting operation will be described later.

The M multiplier 301 outputs a product of a gray-scale value $D_i$, which is indicated by each of the gray-scale data DR, DG, and DB corresponding to the respective colors, and a coefficient M to the subtracter 302 as a target light amount $T_i$ ($=M \cdot D_i$). The subtracter 302 outputs a value, which is obtained by subtracting the target light amount $T_i$ from the light amount measurement value $P_i$, to the multiplier 303 and the G6 divider 314 as a light amount error $\delta_i$ ($=P_i - T_i$).

The multiplier 303 outputs a product (hereinafter, referred to as a moment $MT_i$) of the gray-scale value $D_i$ and the light amount error $\delta_i$, to the G7 divider 304. The G7 divider 304 outputs a value, which is obtained by dividing the moment $MT_i$ by a coefficient G7, to the G3 divider 305. The G3 divider 305 outputs a value, which is obtained by dividing the output value ($MT_i/G7$) of the G7 divider 304 by a coefficient G3, to the adder 306.

The adder 306 outputs a value, which is obtained by adding the output value ($MT_i/G7 \cdot G3$)) of the G3 divider 305 and the output value of the flip-flop 307, to a D input terminal of the flip-flop 307. The flip-flop 307 is a D flip-flop and reflects an input value of the D input terminal as an output value in synchronization with a pixel synchronizing clock signal CL. That is, the adder 306 and the flip-flop 307 form a addition circuit of the moment $MT_i$ ($=\delta_k \cdot D_i$), and an output value of the flip-flop 307 becomes an integrated value of the moment $MT_i$ is referred to as $Sa_k$. In addition, $Sa_k = \delta_1 \cdot D_1 + \ldots + \delta_i \cdot D_i + \ldots + \delta_k \cdot D_k$.

The G2 divider 308 outputs a value, which is obtained by dividing the integrated value $Sa_k$ of the moment $MT_i$ by a coefficient G2, to the subtracter 310. The subtracter 310 outputs a value, which is obtained by subtracting the output value ($=Sa_k/G2$) of the G2 divider 308 from the output value of the flip-flop 311, to a D input terminal of the flip-flop 311. The flip-flop 311 is a D flip-flop and reflects an input value of the D input terminal as an output value in synchronization with the pixel synchronizing clock signal CL. Here, a value obtained by multiplying the gray-scale current command value Dapc2, which is initial set by the initial setting circuit 300, by a coefficient G1 using the G1 multiplier 323 is loaded as an initial output value $a_{k-1}$ of the flip-flop 311. That is, a correction circuit which calculates $a_k = a_{k-1} - \mu a \cdot Sa_k$, which is expressed in the expression (9), is formed by the subtracter 310 and the flip-flop 311, and the output value of the flip-flop 311 becomes $a_k$.

The G1 divider 312 outputs a value, which is obtained by dividing the output value $a_k$ of the flip-flop 311 by the coefficient G1, to the D/A converter 95 as the gray-scale current command value Dapc2.

The G6 divider 314 outputs a valuer which is obtained by dividing the light amount error $\delta_i$ by a coefficient G6, to the adder 315. The adder 315 outputs a value, which is obtained by adding the output value ($\delta_i/G6$) of the G6 divider 314 and the output value of the flip-flop 316, to a D input terminal of the flip-flop 316. The flip-flop 316 is a D flip-flop and reflects an input value of the D input terminal as an output value in synchronization with the pixel synchronizing clock signal CL. That is, the adder 315 and the flip-flop 316 form an addition circuit of the light amount error $\delta_i$, and an output value of the flip-flop 316 becomes an integrated value of the light amount error $\delta_i$. Hereinafter, the integrated value of the light amount error $\delta_i$ is referred to as $Sb_k$. In addition, $Sb_k = \delta_1 + \ldots + \delta_i + \ldots + \delta_k$.

The G5 divider 317 outputs a value, which is obtained by dividing the integrated value $Sb_k$ of the light amount error $\delta_i$ by a coefficient G5, to the subtracter 319. The subtracter 319 outputs a value, which is obtained by subtracting the output value ($=Sb_k/G5$) of the G5 divider 317 from the output value of the flip-flop 320, to a D input terminal of the flip-flop 320. The flip-flop 320 is a D flip-flop and reflects an input value of the D input terminal as an output value in synchronization with the pixel synchronizing clock signal CL. Here, a value obtained by multiplying the threshold current command value Dapc1, which is initial set by the initial setting circuit 300, by a coefficient G4 using the G4 multiplier 324 is loaded as an initial output value $b_{k-1}$ of the flip-flop 320. That is, a correction circuit which calculates $b_k = b_{k-1} - \mu b \cdot Sb_k$, which is expressed in the expression (11), is formed by the subtracter 319 and the flip-flop 320, and the output value of the flip-flop 320 becomes $b_k$.

The G4 divider 321 outputs a value, which is obtained by dividing the output value $b_k$ of the flip-flop 320 by the coefficient G4, to the D/A converter 94 as the threshold current command value Dapc1.

In addition, by providing the G7 divider 304, G3=G6, G2=G5, and G1=G4 become possible. As a result, since it is possible to make a circuit common, the circuit size can be reduced.

The light amount correction circuit 93 has been described and an explanation will now be made referring back to FIG. 1.

The D/A converter 94 converts the threshold current command value Dapc1, which is input from the light amount correction circuit 93, into the threshold current command voltage Vapc1 (=Gda·Dapc1) and outputs the threshold current command voltage Vapc1 to the red laser driver 20R. D/A converter 95 converts the gray-scale current command value Dapc2, which is input from the light amount correction circuit 93, into the gray-scale current command voltage Vapc2 (=Gda·Dapc2) and outputs the gray-scale current command voltage Vapc2 to the red laser driver 20R.

In addition, although the above explanation has been made by using the correction circuit block for red color as a representative example, the same is true for correction circuit blocks for green and blue colors.

The screen 100 is a transmissive screen that allows the laser beams LR, LG, and LB, which are scanned by the laser scanning portion 50, to be transmitted therethrough. That is, the image display device LSD is a rear projection type projector, and a user sees a display image from a surface opposite an irradiation surface of the laser beams LR, LG, and LB on the screen 100. In addition, although not shown in FIG. 1, the image display device LSD has a structure in which only a viewing-side surface of the screen 100 is exposed and the other components are accommodated inside a housing so that there is no influence caused by external light.

Next, an operation of the image display device LSD according to the present embodiment configured as described above will be described. In addition, although an explanation will be made by using the correction circuit block for red color as a representative example, the same is true for the correction circuit blocks for green and blue colors.

Initial Setting Operation When Power is Supplied

Figure 12:
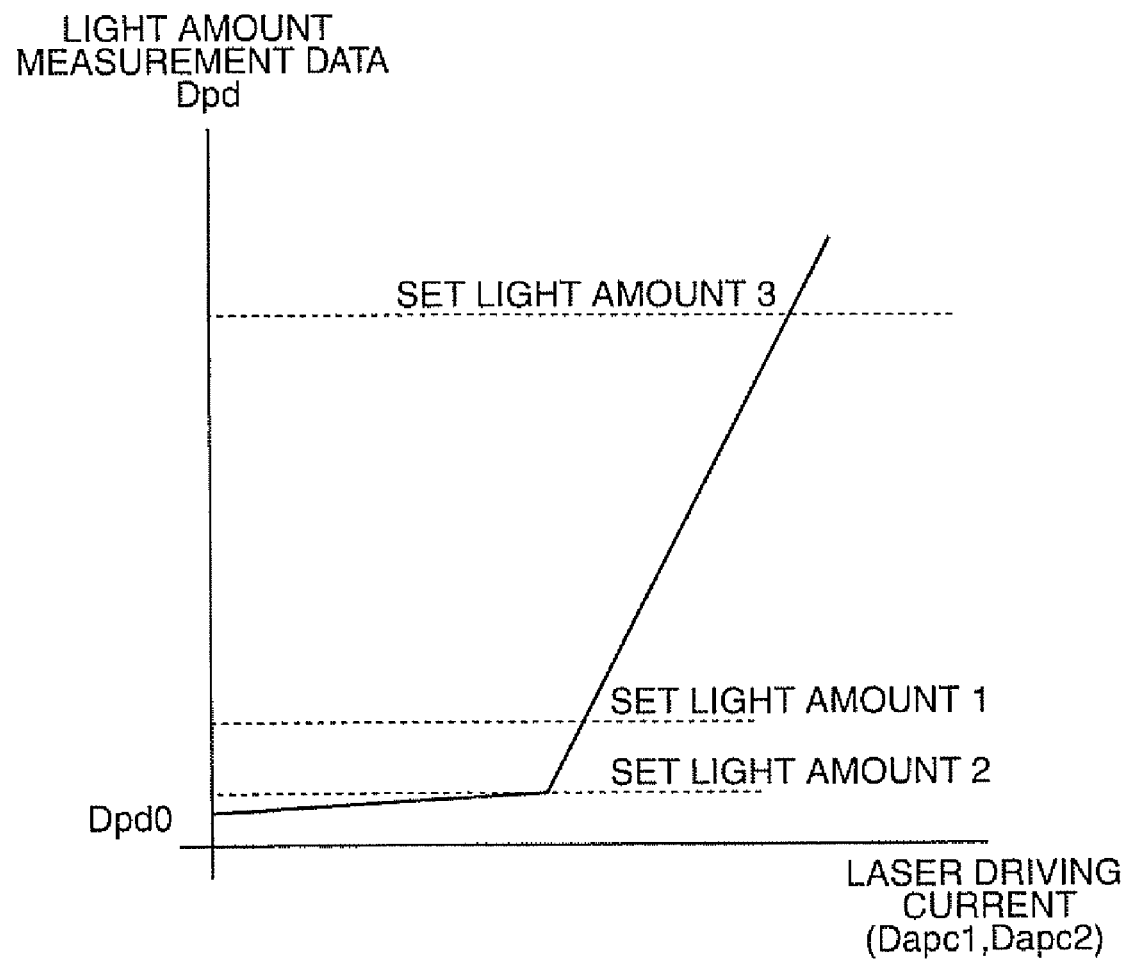
FIG. 12 is a view explaining an initial setting operation performed in the light amount correction circuit in the image display device according to the embodiment.

First, an initial setting operation performed by the initial setting circuit 300 of the light amount correction circuit 93 when power is supplied will be described. FIG. 12 is a characteristic view illustrating the correspondence relationship between Dpd (that is, actual measurement value P of red laser light amount), which is an output of the A/D converter 92, and a laser driving current. As shown in FIG. 12, even though a characteristic curve itself is the same as that shown in FIG. 4, it can be seen that an offset occurs in the Dpd by offset of the T/V converter 91. The initial setting operation of the initial setting circuit 300 when the power is supplied is performed to correct the offset superimposed on the Dpd.

Figure 13:
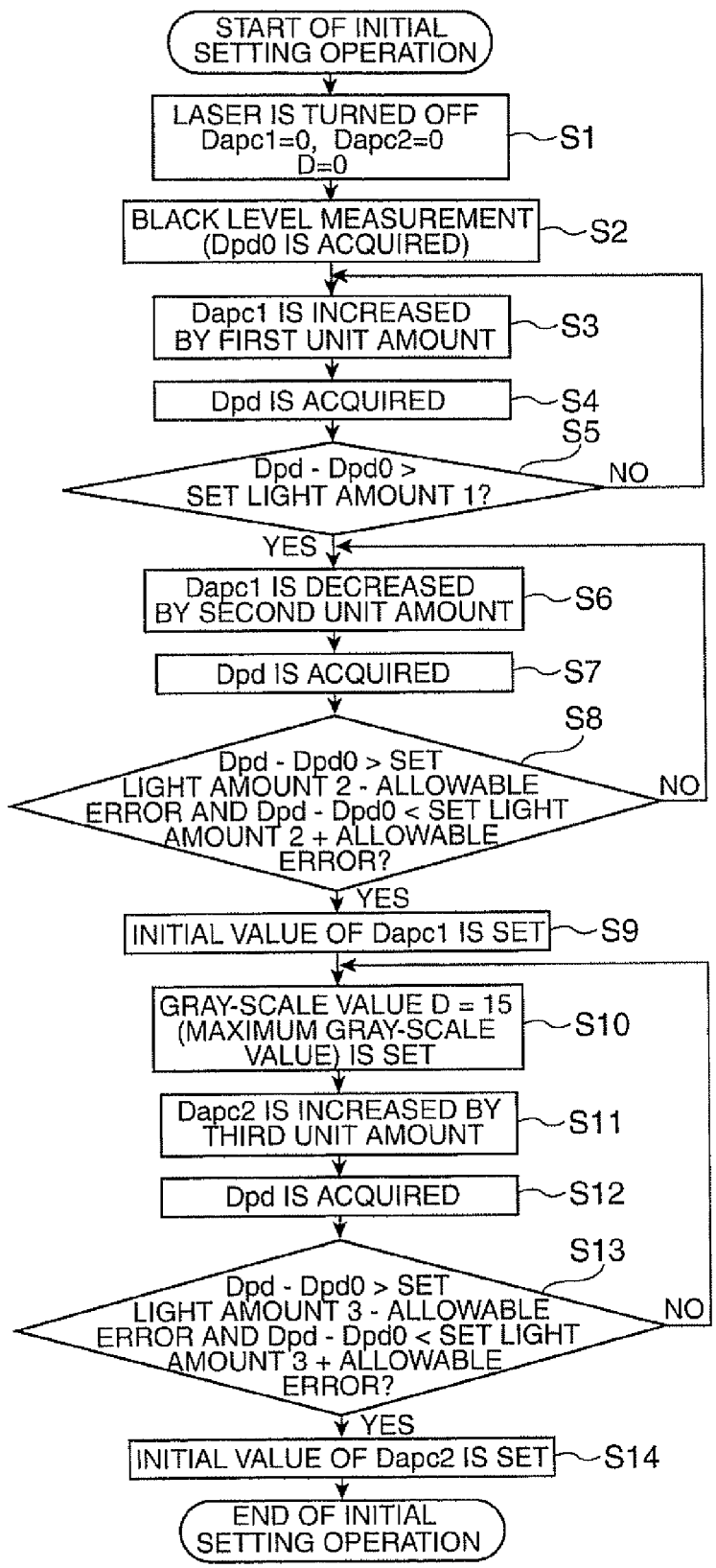
FIG. 13 is a flow chart illustrating the initial setting operation performed in the light amount correction circuit in the image display device according to the embodiment.

FIG. 13 is a flow chart illustrating the initial setting operation performed by the initial setting circuit 300 of the light amount correction circuit 93. First, in order to completely turn off the red laser diode 30R, the initial setting circuit 300 sets the threshold current command value Dapc1 to 0 and the gray-scale current command value Dapc2 to 0 and outputs the red gray-scale data DR, which indicates the gray-scale value D=0, to the red laser driver 20R (step S1). As a result, the laser driving current IR supplied from the red laser driver 20R to the red laser diode 30R becomes completely zero, making the red laser diode 30R completely turned off. At this time, the initial setting circuit 300 acquires the Dpd input from the A/D converter 92 as an actual measurement value Dpd0 of a black level (step S2).

Then, the initial setting circuit 300 increases the threshold current command value Dapc1 by a first unit amount (step S3) and acquires the Dpd at this time (step S4). Then, the initial setting circuit 300 determines whether or not a value of Dpd−Dpd0 is larger than a set light amount 1 set as a clear emission state as shown in FIG. 12 (step S5). If NO, the process returns to step S3 to repeat processing in steps S3 to S5.

On the other hand, if YES in step S5, that is, if Dpd−Dpd0>set light amount 1, the initial setting circuit 300 decreases the threshold current command value Dapc1 by a second unit amount (step S6) and acquires the Dpd at this time (step S7).

Then, the initial setting circuit 300 determines whether or not conditions of Dpd−Dpd0>set light amount 2−allowable error and Dpd−Dpd0<set light amount 2+allowable error are satisfied (step S8). If NO, the process returns to step S6 to repeat processing in steps S6 to S8. Here, the set light amount 2 is set to a value considered as a black level as shown in FIG. 12.

On the other hand, if YES in step S8, the initial setting circuit 300 sets a value of the Dapc1 at that time as an initial value of the threshold current command value Dapc1 (step S9). At the same time, the initial setting circuit 300 outputs an initial value of the threshold current command value Dapc1 to the G4 multiplier 324 and a value, which is obtained by multiplying the initial value of the threshold current command value Dapc1 by the coefficient G4 using the G4 multiplier 324, is loaded to the flip-flop 320 as an initial output value $b_{k-1}$ of the flip-flop 320.

Subsequently, the initial setting circuit 300 outputs the red gray-scale data DR indicating the gray-scale value D=15 (that is, a maximum gray-scale value) to the red laser driver 20R (step S10), increases the gray-scale current command value Dapc2 by a third unit amount (step S11), and acquires the Dpd at this time (step S12). Then, the initial setting circuit 300 determines whether or not conditions of Dpd−Dpd0>set light amount 3−allowable error and Dpd−Dpd0<set light amount 3+allowable error are satisfied (step S13), If NO, the process returns to step S10 to repeat processing in steps S10 to S13. Here, the set light amount 3 is set to a target value of the maximum emission amount as shown in FIG. 12.

On the other hand, if YES in step S13, the initial setting circuit 300 sets a value of the Dapc2 at that time as an initial value of the gray-scale current command value Dapc2 (step S14). At the same time, the initial setting circuit 300 outputs an initial value of the gray-scale current command value Dapc2 to the G1 multiplier 323 and a value, which is obtained by multiplying the initial value of the gray-scale current command value Dapc2 by the coefficient G1 using the G1 multiplier 323, is loaded to the flip-flop 311 as an initial output value $a_{k-1}$ of the flip-flop 311. By the initial setting operation described above, the initial value of the threshold current command value Dapc1 and the initial value of the gray-scale current command value Dapc2 in which the offset superimposed on the Dpd is corrected are set.

In addition, the initial setting operation described above is similarly performed in the correction circuit blocks for green and blue colors.

Normal Operation

Next, a normal operation of the image display device LSD will be described with reference to a timing chart of FIG. 14. Here, a video signal and synchronous signals (the vertical synchronous signal Vsync and the horizontal synchronous signal Hsync) have already input from an external image supply apparatus, the video signal processing circuit 10 generates digital gray-scale data for specifying a gray-scale level corresponding to each pixel of an image to be displayed on the basis of the video signal and the synchronous signals and stores the digital gray-scale data in the internal memory in the unit of one frame.

In addition, it is assumed that the reflecting mirror 50a of the laser scanning portion 50 starts rotating by means of a scan driving signal that is output from the scan driving portion 60 according to an input of the synchronous signals, the rotation angle θ2 of the reflecting mirror 50a with respect to the vertical scanning direction matches an angle corresponding to the start position of one frame on the screen 100 at time t1, and the rotation angle θ1 of the reflecting mirror 50a with respect to the horizontal scanning direction matches an angle corresponding to the start position of one horizontal scanning period on the screen 100 at time t2. That is, the frame timing signal Ft for specifying the start of one frame is output from the timing signal generating circuit 70c at the time t1 and the scanning timing signal St for specifying the start of one horizontal scanning period is output at time t2. Furthermore, it is assumed that the rotation angle θ1 of the reflecting mirror 50a with respect to the horizontal scanning direction matches the angle corresponding to the end position of one horizontal scanning period on the screen 100 at time t3. That is, the scanning timing signal St for specifying the end of one horizontal scanning period is output from the timing signal generating circuit 70c at time t3.

When the scanning timing signal St for specifying the start of one horizontal scanning period is input at time t2, the pixel synchronizing clock generating circuit 80 generates the pixel synchronizing clock signal CL that specifies irradiation timing of the laser beams LR, LG, and LB corresponding to each pixel in one horizontal scanning period and outputs the pixel synchronizing clock signal CL to the video signal processing circuit 10 and the light amount correction circuit 93. As described above, since the relationship between the rotation angle θ1 in one horizontal scanning period, that is, an irradiation position Qx and time having passed from the start of one horizontal scanning period is unique, it is natural that the relationship between the irradiation position Qx corresponding to each pixel in one horizontal scanning period and elapsed time is unique. Accordingly, in the present embodiment, as shown in FIG. 14, the scanning timing signal St for specifying the start of one horizontal scanning period is input on the basis of the unique relationship between the irradiation position Qx corresponding to each pixel in one horizontal scanning period and the elapsed time and then the pulse-shaped pixel synchronizing clock signal CL that specifies irradiation timing of the laser beams LR, LG, and LB corresponding to each pixel corresponding to the elapsed time is generated.

Figure 14:
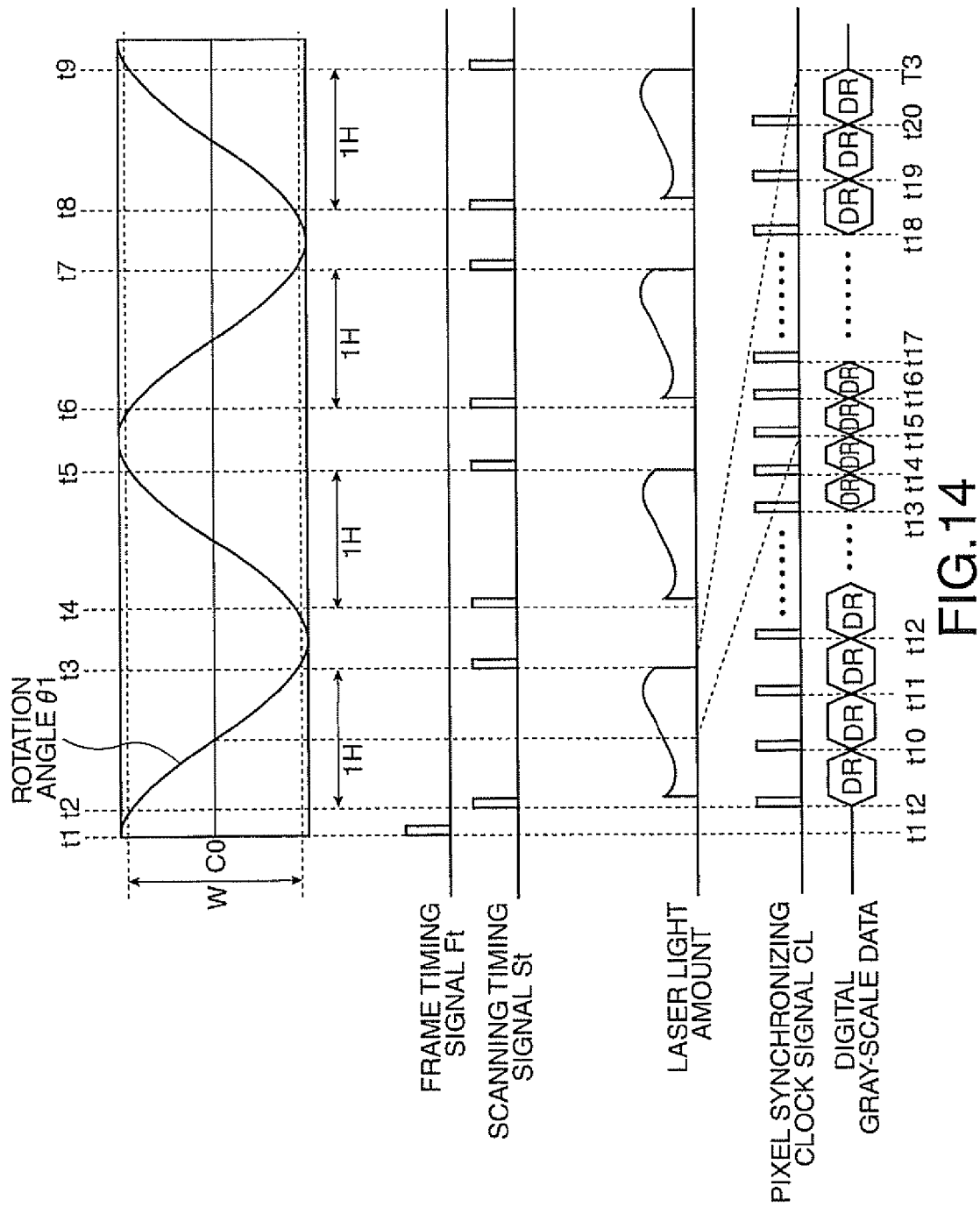
FIG. 14 is a timing chart illustrating a normal operation of the image display device according to the embodiment.

As can be seen from FIG. 14, a pulse interval of the pixel synchronizing clock signal CL changes with the irradiation position Qx, that is, elapsed time. For example, the pulse interval is short in the neighborhood of time t13 to t17, which is near the middle of the screen 100, and is long in the neighborhood of both ends of the screen 100. This is because a change speed (scanning speed) of the rotation angle θ1 of the reflecting mirror 50a changes sinusoidally according to the elapsed time due to the characteristic of the laser scanning portion 50 which is a MEMS scanner.

On the other hand, when the frame timing signal Ft for specifying the start of one frame and the scanning timing signal St for specifying the start of one horizontal scanning period are input, the video signal processing circuit 10 reads digital gray-scale data (red gray-scale data DR, green gray-scale data DG, and blue gray-scale data DB) of each pixel corresponding to a first-row horizontal scanning period from a storage region of an internal memory, in which digital gray-scale data of a first frame is stored, and sequentially outputs the red gray-scale data DR, the green gray-scale data DG, and the blue gray-scale data DB in synchronization with the pixel synchronizing clock signal CL. Specifically, as shown in FIG. 14, the video signal processing circuit 10 outputs the red gray-scale data DR for red pixels corresponding to the start position (first row) of one horizontal scanning period to the red laser driver 20R and the light amount correction circuit 93 when the first pixel synchronizing clock signal CL is input at time t2.

Hereinafter, an explanation will be described focusing on the red gray-scale data DR for the convenience of explanation.

Here, it is assumed that a gray-scale value indicated by the red gray-scale data DR input to the light amount correction circuit 93 is $D_1$ and an actual measurement value of light amount indicated by the light amount measurement data Dpd, which is output from the A/D converter 92 to the light amount correction circuit 93, is $P_1$. In this case, in the light amount correction circuit 93 shown in FIG. 11, an output value of the M multiplier 301 becomes $T_1 = M \cdot D_1$, an output value of the subtracter 302 becomes $\delta_1 = P_1 - M \cdot D_1$, an output value of the multiplier 303 becomes $D_1 \cdot \delta_1$, an output value of the flip-flop 307 becomes $Sa_1 = D_1 \cdot \delta_1$, and an output value of the flip-flop 311 becomes $a_1 = a0$ (initial value of the gray-scale current command value Dapc2) $- \mu a \cdot Sa_1$. Such $a_1$ is output to the D/A converter 95 as the gray-scale current command value Dapc2, is converted into the gray-scale current command voltage Vapc2 by the D/A converter 95, and is output to the first current source CS1 of the red laser driver 20R.

On the other hand, an output value of the flip-flop 316 becomes $Sb_1 = \delta_1$, and an output value of the flip-flop 320 becomes $b_1 = b0$ (initial value of the threshold current command value Dapc1) $- \mu b \cdot Sb_1$. Such $b_1$ is output to the D/A converter 94 as the threshold current command value Dapc1, is converted into the threshold current command voltage Vapc1 by the D/A converter 94, and is output to the second current source CS2 of the red laser driver 20R.

As a result, since the red gray-scale data DR for red pixels corresponding to the start position (first row) of one horizontal scanning period, the gray-scale current command voltage Vapc2, and the threshold current command voltage Vapc1 are input to the red laser driver 20R, a laser driving current expressed with $IR = H2 \cdot Vapc2 \cdot D_1 + H1 \cdot Vapc1$ is generated and is then supplied to the red laser diode 30R. Then, the red laser diode 30R generates the laser beam LR corresponding to a gray-scale value of a red pixel on the first row, and the laser beam LR is irradiated to the irradiation position Qx corresponding to the red pixel on the first row of one horizontal scanning period by the reflecting mirror 50a.

Subsequently, as shown in FIG. 14, the video signal processing circuit 10 outputs the red gray-scale data DR for red pixels corresponding to the second row of one horizontal scanning period to the red laser driver 20R and the light amount correction circuit 93 when a pixel synchronizing clock signal corresponding to the second row of one horizontal scanning period is generated at time t10.

Here, it is assumed that a gray-scale value indicated by the red gray-scale data DR input to the light amount correction circuit 93 is $D_2$ and an actual measurement value of light amount indicated by the light amount measurement data Dpd, which is output from the A/D converter 92 to the light amount correction circuit 93, is $P_2$. In this case, in the light amount correction circuit 93 shown in FIG. 11, an output value of the M multiplier 301 becomes $T_2 = M \cdot D_2$, an output value of the subtracter 302 becomes $\delta_2 = P_2 - M \cdot D_2$, an output value of the multiplier 303 becomes $D_2 \cdot \delta_2$, an output value of the flip-flop 307 becomes $Sa_2 = D_1 \cdot \delta_1 + D_2 \cdot \delta_2$, and an output value of the flip-flop 311 becomes $a_2 = a_1 - \mu a \cdot Sa_2$. Such $a_2$ is output to the D/A converter 95 as the gray-scale current command value Dapc2, is converted into the gray-scale current command voltage Vapc2 by the D/A converter 95, and is output to the first current source CS1 of the red laser driver 20R.

On the other hand, an output value of the flip-flop 316 becomes $Sb_2 = \delta_1 + \delta_2$, and an output value of the flip-flop 320 becomes $b_2 = b_1 - \mu b \cdot Sb_2$. Such $b_2$ is output to the D/A converter 94 as the threshold current command value Dapc1, is converted into the threshold current command voltage Vapc1 by the D/A converter 94, and is output to the second current source CS2 of the red laser driver 20R.

As a result, since the red gray-scale data DR for red pixels corresponding to the second row of one horizontal scanning period, the gray-scale current command voltage Vapc2, and the threshold current command voltage Vapc1 are input to the red laser driver 20R, a laser driving current expressed with IR=H2·Vapc2·D$_2$+H1·Vapc1 is generated and is then supplied to the red laser diode 30R. Then, the red laser diode 30R generates the laser beam LR corresponding to a gray-scale value of a red pixel on the second row, and the laser beam LR is irradiated to the irradiation position Qx corresponding to the red pixel on the second row of one horizontal scanning period by the reflecting mirror 50a.

Subsequently, as shown in FIG. 14 the video signal processing circuit 10 outputs the red gray-scale data DR for red pixels corresponding to the third row of one horizontal scanning period to the red laser driver 20R and the light amount correction circuit 93 when a pixel synchronizing clock signal corresponding to the third row of one horizontal scanning period is generated at time t11.

Here, it is assumed that a gray-scale value indicated by the red gray-scale data DR input to the light amount correction circuit 93 is D$_3$ and an actual measurement value of light amount indicated by the light amount measurement data Dpd, which is output from the A/D converter 92 to the light amount correction circuit 93, is P$_3$. In this case, in the light amount correction circuit 93 shown in FIG. 11, an output value of the M multiplier 301 becomes T$_3$=M·D$_3$, an output value of the subtracter 302 becomes δ$_3$=P$_3$–M·D$_3$, an output value of the multiplier 303 becomes D$_3$·δ$_3$, an output value of the flip-flop 307 becomes Sa$_3$=D$_1$·δ$_1$+D$_2$·δ$_2$+D$_3$δ$_3$, and an output value of the flip-flop 311 becomes a$_3$=a$_2$–μa·Sa$_3$. Such a$_3$ is output to the D/A converter 95 as the gray-scale current command value Dapc2, is converted into the gray-scale current command voltage vapc2 by the D/A converter 95, and is output to the first current source CS1 of the red laser driver 20R.

On the other hand, an output value of the flip-flop 316 becomes Sb$_3$=δ$_1$+δ$_2$+δ$_3$, and an output value of the flip-flop 320 becomes b$_3$=b$_2$–μb·Sb$_3$. Such b$_3$ is output to the D/A converter 94 as the threshold current command value Dapc1, is converted into the threshold current command voltage Vapc1 by the D/A converter 94, and is output to the second current source CS2 of the red laser driver 20R.

As a result, since the red gray-scale data DR for red pixels corresponding to the third row of one horizontal scanning period, the gray-scale current command voltage Vapc2, and the threshold current command voltage Vapc1 are input to the red laser driver 20R, a laser driving current expressed with IR=H2·Vapc2·D$_3$+H1·Vapc1 is generated and is then supplied to the red laser diode 30R. Then, the red laser diode 30R generates the laser beam LR corresponding to a gray-scale value of a red pixel on the third row, and the laser beam LR is irradiated to the irradiation position Qx corresponding to the red pixel on the third row of one horizontal scanning period by the reflecting mirror 50a.

The same operation is repeated until a last row (equivalent to time t20 of FIG. 14) of one horizontal scanning period, an image in one horizontal scanning period from time t2 to t3 is displayed on the screen 100.

Furthermore, in FIG. 14, a period from time t4 to t5 indicates next (second-row) one horizontal scanning period, a period from time t6 to t7 indicates one horizontal scanning period of a third row, and a period from t8 to t9 indicates one horizontal scanning period of a fourth row. An image corresponding to one frame is displayed on the screen 100 by performing the same operation as described above within each one horizontal scanning period and completing one horizontal scanning period of the last row.

In addition, it is needless to say that the rotation angle θ2 of the reflecting mirror 50a in the vertical scanning direction changes to an angle corresponding to the next horizontal scanning period whenever one horizontal scanning period is completed. In addition, although the above explanation has been made focusing on the red gray-scale data DR, the same light amount correction is performed for the green gray-scale data DG and the blue gray-scale data DB by the correction circuit block corresponding thereto.

As described above, in the image display device LSD according to the present embodiment, light amount correction according to a change of laser characteristic caused by a temperature change during an operation, for example, can be performed in real time and high accuracy of light amount correction can be obtained by sequentially calculating the variables a and b such that a light amount error, which is a difference between a target light amount and an actual measurement value of light amount, is minimized while performing a display operation and setting the threshold current command value Dapc1, by which the threshold current Ith can be corrected, and the gray-scale current command value Dapc2, by which the differential efficiency η can be corrected, on the basis of the variables a and b. As a result, the display quality can be improved.

Figure 15:
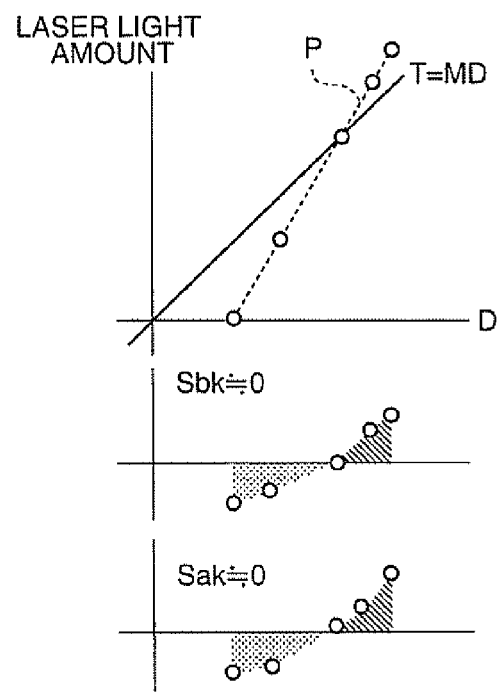
FIG. 15 is a first explanatory view illustrating a modified example of the image display device according to the embodiment.
Figure 16:
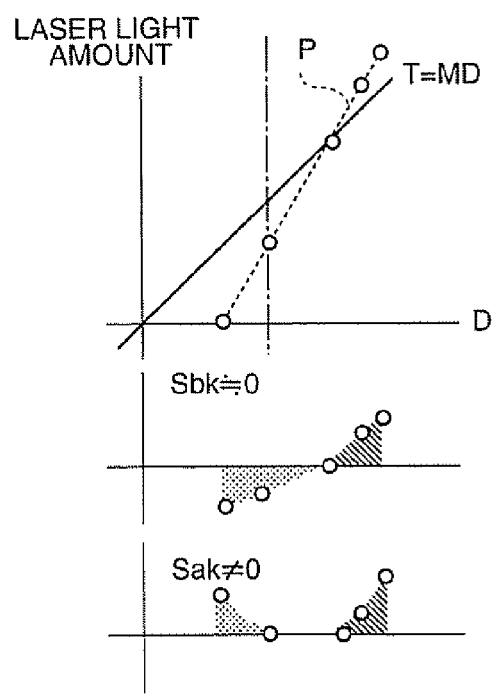
FIG. 16 is a second explanatory view illustrating a modified example of the image display device according to the embodiment.

Here, in the case where a difference between the target light amount T and the actual measurement value P of laser light amount is like a state shown in FIG. 15, a phenomenon in which an integrated value Sb$_k$ of light amount errors and an integrated value Sa$_k$ of a product (moment) of a light amount error and a gray-scale value become approximately 0 and accordingly, a correction operation in the light amount correction circuit 93 stops may occur. In order to prevent such a phenomenon, as shown in FIG. 16, by setting a gray-scale value used in calculating a moment to a middle value in a range of a minimum gray-scale value to a maximum gray-scale value, it can be prevented that the integrated value Sa$_k$ of a product (moment) of the light amount error and the gray-scale value become approximately 0. As a result, stopping of the correction operation in the light amount correction circuit 93 can be prevented.

Figure 17:
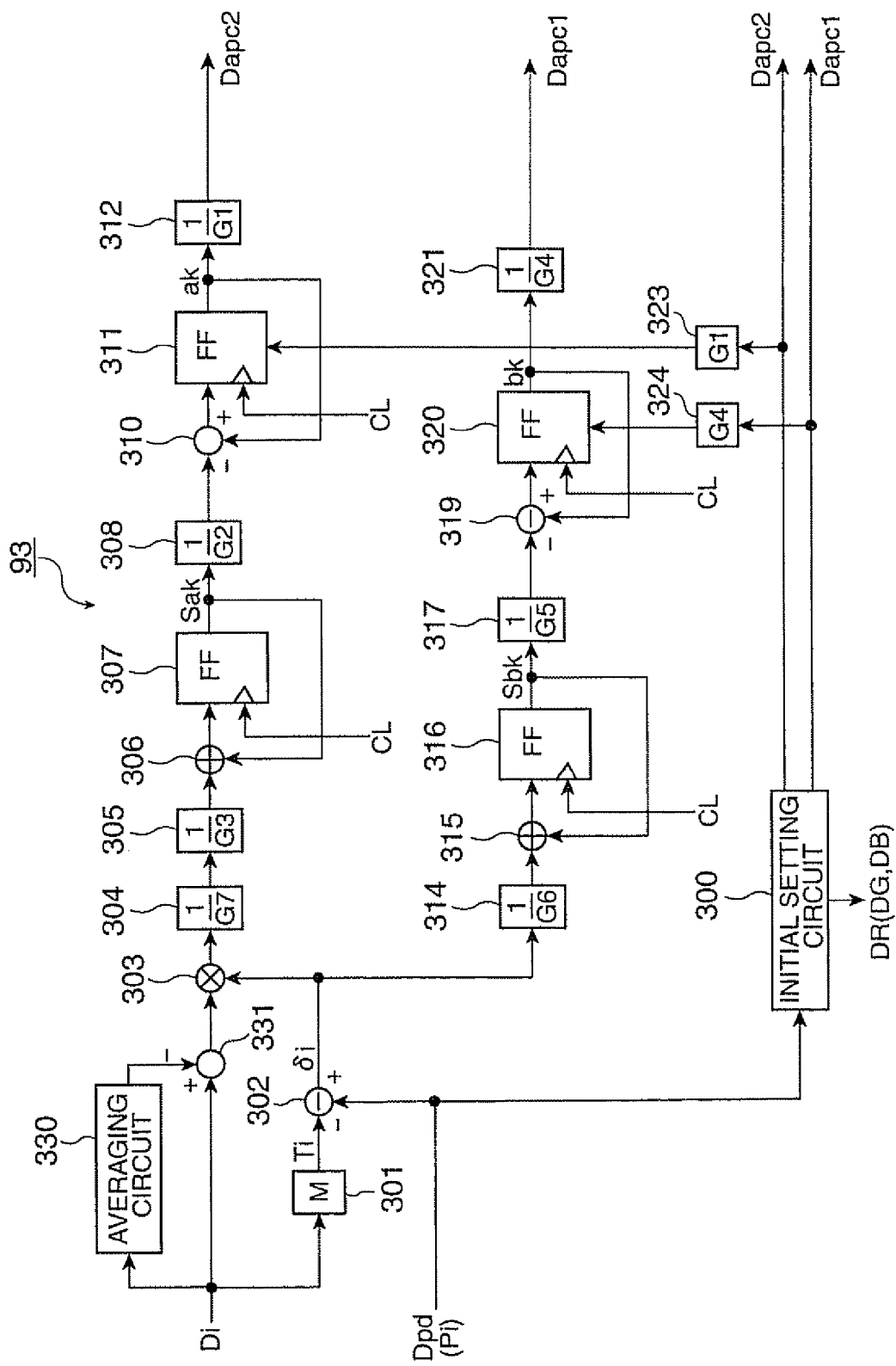
FIG. 17 is a third explanatory view illustrating a modified example of the image display device according to the embodiment.

In addition, by sequentially calculating an average value of gray-scale values and using the average value as a gray-scale value used when calculating the moment, it can be prevented that the integrated value Sa$_k$ of a product (moment) of the light amount error and the gray-scale value becomes approximately zero in the same manner as described above. Explaining this with the expression, an integrated value of a product of a light amount error and a difference between the gray-scale value D$_k$ and an average gray-scale value D$_{ave}$ is calculated like the following expression (33) instead of the expression (10). In this case, as shown in FIG. 17, it is preferable to provide an averaging circuit 330, which sequentially calculates an average value of the gray-scale value D$_j$, before the multiplier 303 and a subtracter 331 which subtracts an output value (average gray-scale value) of the averaging circuit 330 from a gray-scale value. Furthermore, instead of the average value, a value set beforehand, for example, a gray-scale value 128, may also be used when calculating the moment as long as 8-bit gray scale expression is possible.

$$Sa_k=Sa_{k-1}+\delta_k*(D_k-D_{ave}) \quad (33)$$

Furthermore, in the embodiment described above, the light amount correction is performed during a display operation. However, the light amount correction may not be performed normally when a gray-scale value is biased, for example, when a very dark image exists. As measures against that described above, a laser diode may be emitted and an operation of light amount correction may be performed in the light amount correction circuit 93 by making the video signal processing circuit 10 generate a predetermined gray-scale value (gray-scale data) or a pseudo pixel synchronizing clock signal during a period for which image display is not performed (period for which a laser beam is not scanned onto the screen 100), like a period of time t3 to t4 or a period of time t5 to t6 shown in FIG. 14.

Furthermore, in the embodiment described above, past data may be less weighted since it is preferable to put importance on latest data (value of a product of a light amount error and a gray-scale value) when calculating the integrated value $Sb_k$ of a light amount error and the integrated value $Sa_k$ of a product (moment) of a light amount error and a gray-scale value. Specifically, it is preferable to provide a weighting constant multiplier on a feedback path from the output terminal of the flip-flop 307 to the adder 306 and a feedback path from the output terminal of the flip-flop 316 to the adder 315 shown in FIG. 11. This weighting constant is set to a value $7/8$, for example, which is smaller than 1. In this manner, since data is discarded sequentially from past data when calculating the integrated value $Sb_k$ of a light amount error and the integrated value $Sa_k$ of the product (moment) of a light amount error and a gray-scale value, the latest data can be weighted. Furthermore, in the embodiment described above, the variables a and b are sequentially corrected to values proportional to the integrated value $Sb_k$ of a light amount error and the integrated value $Sa_k$ of the product (moment) of a light amount error and a gray-scale value. However, the variables a and b may be corrected to constant value of the integrated value $Sb_k$ and the integrated value $Sa_k$.

In addition, although a laser scanning display that displays an image by scanning a laser beam onto the screen 100 has been explained as an example in the above embodiment, the invention may also be applied to an image display device that displays an image by scanning light generated in an LED (light emitting diode) or other light sources without being limited to the above case. In addition, although a laser scanning display that uses one scanner for laser diodes corresponding to three colors has been explained as an example in the above embodiment, a configuration in which a scanner is provided for every color may also be adopted without being limited to the above case.

Moreover, the circuit configuration of the red laser driver 20R (green laser driver 20R, blue laser driver 20B) described with reference to FIG. 3 in the above embodiment may be properly changed according to the maximum number of gray-scale levels. That is, since the maximum number of gray-scale levels is assumed to be '16 (4 bits)' in the above embodiment, the number of output-side transistors of the current mirror circuit in FIG. 3 is set to four (first output-side transistor To1 to fourth output-side transistor To4). However, for example, in the case where the maximum number of gray-scale levels is '256 (8 bits)', it is preferable that eight output-side transistors of the current mirror circuit be provided (eight switching elements are also provided).

In this case, preferably, an electrical property of an output-side transistor corresponding to first-bit bit data is set such that a current of $1/255$ of the current Is is generated, an electrical property of an output-side transistor corresponding to second-bit bit data is set such that a current of $2/255$ of the current Is is generated, an electrical property of an output-side transistor corresponding to third-bit bit data is set such that a current of $4/255$ of the current Is is generated, an electrical property of an output-side transistor corresponding to fourth-bit bit data is set such that a current of $8/255$ of the current Is is generated, an electrical property of an output-side transistor corresponding to fifth-bit bit data is set such that a current of $16/255$ of the current Is is generated, an electrical property of an output-side transistor corresponding to sixth-bit bit data is set such that a current of $32/255$ the current Is is generated, an electrical property of an output-side transistor corresponding to seventh-bit bit data is set such that a current of $64/255$ of the current Is is generated, and an electrical property of an output-side transistor corresponding to eighth-bit bit data is set such that a current of $128/255$ of the current Is is generated.

The entire disclosure of Japanese Patent Application No. 2007-268004, filed Oct. 15, 2007 is expressly incorporated by reference herein.

What is claimed is:

1. A light source device comprising:
a light source;
a driving signal generating unit that supplies a driving signal to the light source;
a light amount measuring unit that measures the amount of light of the light source; and
a light amount correcting unit that calculates as a light amount error a difference between a target light amount corresponding to a gray-scale value indicated by gray-scale data input from the outside and the amount of light measured by the light amount measuring unit, corrects a differential efficiency, which is defined as a variation of the amount of light with respect to a variation in a driving signal of the light source, by an integrated value of a product of the light amount error and the gray-scale value, corrects a threshold value of the driving signal minimum-required to make the light source emit light by an integrated value of the light amount error, and outputs to the driving signal generating unit a command signal for generating a driving signal having a differential efficiency and a threshold value after the correction.

2. The light source device according to claim 1,
wherein the driving signal generating unit includes:
a gray-scale current generating unit that generates a gray-scale current corresponding to the gray-scale value on the basis of the gray-scale value indicated by the gray-scale data input from the outside and a gray-scale current command signal input from the light amount correcting unit;
a threshold current generating unit that generates a threshold current corresponding to a threshold current command signal input from the light amount correcting unit; and
a current adding unit that supplies an addition current of the gray-scale current and the threshold current to the light source as the driving signal, and
the light amount correcting unit calculates a current value of a first variable corresponding to the differential efficiency as a differential efficiency after the correction by subtracting a value proportional to an integrated value of a product of the light amount error and the gray-scale value from a previous value of the first variable and outputs the gray-scale current command signal corresponding to the current value of the first variable to the gray-scale current generating unit and calculates a current value of a second variable corresponding to the threshold value as a threshold value after the correction by subtracting a value proportional to an integrated value of the light amount error from a previous value of the second variable and outputs the threshold current command signal corresponding to the current value of the second variable to the threshold current generating unit.

3. The light source device according to claim 1,
wherein the light amount correcting unit uses, as a gray-scale value used in calculating a product of the light amount error and the gray-scale value, a difference between the gray-scale value and an average value of the gray-scale values, a gray-scale value set beforehand, or a middle value in a range of a minimum gray-scale value to a maximum gray-scale value.

4. The light source device according to claim 1,
wherein the light amount correcting unit multiplies a weighting constant so as to be discarded sequentially from a value of a product of a past light amount error and a past gray-scale value when an integrated value of a product of the light amount error and the gray-scale value is calculated and multiplies a weighting constant so as to be discarded sequentially from a value of a past light amount error when an integrated value of the light amount error is calculated.

5. The light source device according to claim 2,
wherein as an initial setting operation for correcting an offset of a measured light amount that the light amount measuring unit has at the time of supply of power, in the case where the measured light amount when the gray-scale current command signal, the threshold current command signal, and gray-scale data for completely turning off the light source have been output to the driving signal generating unit is acquired as a black-level light amount and then a value obtained by subtracting the black-level light amount from the measured light amount by increasing the threshold current command signal reaches a first set light amount that specifies predetermined brightness, the light amount correcting unit decreases the threshold current command signal, sets as an initial value of the threshold current command signal the threshold current command signal when the value obtained by subtracting the black-level light amount from the measured light amount reaches a second set light amount considered as a black level, outputs gray-scale data indicating a maximum gray-scale value to the driving signal generating unit, increases the gray-scale current command signal, and sets as an initial value of the gray-scale current command signal the gray-scale current command signal when the value obtained by subtracting the black-level light amount from the measured light amount reaches a third set light amount that specifies a maximum target light emission amount.

6. The light source device according to claim 5,
wherein the light amount correcting unit uses an initial value of the threshold current command signal, which is acquired by the initial setting operation, as a previous value of the second variable in calculating a current value of the second variable at the beginning and uses an initial value of the gray-scale current command signal as a previous value of the first variable in calculating a current value of the first variable at the beginning.

7. An image display device that displays an image by scanning light on a projected surface, comprising:
the light source device according to claim 1;
a scanning unit that scans light generated from the light source of the light source device onto the projected surface; and
a video signal processing unit that generates the gray-scale data, which expresses an image to be displayed, on the basis of a video signal supplied from the outside and outputs gray-scale data, which corresponds to the irradiation position of the light on the projected surface, to the driving signal generating unit and the light amount correcting unit of the light source device.

8. The image display device according to claim 7,
wherein during a period for which light is not scanned onto the projected surface, the video signal processing unit outputs predetermined gray-scale data to the driving signal generating unit and the light amount correcting unit of the light source device and the light amount correcting unit performs the correction on the basis of the amount of light of the light source corresponding to the predetermined gray-scale data, which is measured by the light amount measuring unit, and a gray-scale value indicated by the predetermined gray-scale data.

9. A light amount correction method used in a light source device including a light source and a driving signal generating unit that supplies a driving signal to the light source, comprising:
measuring the amount of light of the light source;
calculating, as a light amount error, a difference between a target light amount corresponding to a gray-scale value indicated by gray-scale data input from the outside and the amount of light measured in the measuring of the amount of light of the light source;
calculating an integrated value of a product of the light amount error and the gray-scale value;
correcting a differential efficiency, which is defined as a variation of the amount of light with respect to a variation in a driving signal of the light source, by an integrated value of a product of the light amount error and the gray-scale value;
calculating an integrated value of the light amount error;
correcting a threshold value of the driving signal, which is minimum required to make the light source emit light, by the integrated value of the light amount error; and
outputting to the driving signal generating unit a command signal for generating a driving signal having a differential efficiency and a threshold value after the correction.

* * * * *